United States Patent
Becker et al.

(10) Patent No.: US 6,591,263 B1
(45) Date of Patent: Jul. 8, 2003

(54) MULTI-MODAL TRAVELER INFORMATION SYSTEM

(75) Inventors: Timothy L. Becker, Endicott, NY (US); Theresa M. Bennett, Endicott, NY (US); William R. Harris, Apalachin, NY (US); Scott W. Martens, Vestal, NY (US); Sai L. Ng, Vestal, NY (US); Thomas G. Acton, Endicott, NY (US); Brian D. Balliett, Apalachin, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/066,692

(22) Filed: Apr. 27, 1998

Related U.S. Application Data

(60) Provisional application No. 60/045,158, filed on Apr. 30, 1997.

(51) Int. Cl.[7] .............................................. G06F 17/30
(52) U.S. Cl. ................... 707/3; 707/1; 707/10; 707/6; 709/217; 709/229; 705/5; 705/6; 705/13
(58) Field of Search .............................. 709/206, 208, 709/218, 217, 227; 455/412; 379/10; 380/24; 705/26, 14, 10, 1, 5, 13, 6; 707/43, 104, 4, 6

(56) References Cited

U.S. PATENT DOCUMENTS

| | | | |
|---|---|---|---|
| 4,812,843 A | | 3/1989 | Champion, III et al. |
| 5,237,499 A | * | 8/1993 | Garback ........................ 705/5 |
| 5,313,200 A | | 5/1994 | Sone |
| 5,317,311 A | | 5/1994 | Martell et al. |
| 5,321,737 A | | 6/1994 | Patsiokas |
| 5,406,490 A | | 4/1995 | Braegas |
| 5,428,545 A | | 6/1995 | Maegawa et al. |
| 5,565,909 A | * | 10/1996 | Thibadeau et al. ............. 348/9 |
| 5,579,535 A | | 11/1996 | Orlen et al. |
| 5,659,596 A | * | 8/1997 | Dunn ........................ 455/456 |
| 5,832,451 A | * | 11/1998 | Flake et al. ..................... 705/5 |
| 5,848,396 A | * | 12/1998 | Gerace ........................ 705/10 |
| 5,864,818 A | * | 1/1999 | Feldman ........................ 705/5 |
| 5,881,131 A | * | 3/1999 | Farris et al. .................. 379/27 |
| 5,893,091 A | * | 4/1999 | Hunt et al. ..................... 707/3 |
| 5,897,620 A | * | 4/1999 | Walker et al. .................. 705/5 |
| 5,901,287 A | * | 5/1999 | Bull et al. .................. 709/218 |
| 5,920,815 A | * | 7/1999 | Akhavan ..................... 455/426 |
| 5,946,660 A | * | 8/1999 | McCarty et al. ............... 705/5 |
| 5,948,040 A | * | 9/1999 | DeLorme et al. ........... 701/201 |
| 5,953,706 A | * | 9/1999 | Patel ............................. 705/6 |

(List continued on next page.)

FOREIGN PATENT DOCUMENTS

| | | |
|---|---|---|
| EP | 0 446 985 A1 | 9/1991 |
| FR | 2700629 A1 | 7/1994 |

*Primary Examiner*—Jean M. Corrielus
(74) *Attorney, Agent, or Firm*—Whitham, Curtis & Christofferson, P.C.

(57) ABSTRACT

A system and method for disseminating information concerning, for example, conditions affecting travel routes personalizes information in accordance with individual users or customers by building filters for attributes of the information from attributes of interest to each user, such as nodes of a travel route, which are registered with the system by the user or customer. The information is filtered by the filters constructed from the attributes to form a list of user identifications of users that have registered an attribute of interest which is included in the information provided to the system. Messages are retrieved from storage and communicated to users in accordance with the list of user identifications either automatically over one or more communication media also registered by each user or on a call-in inquiry basis. In the latter case and for modification or additions to registered user information and attributes of interest, the system and method provide for an active automated dialog with the user. Messages may include user-specified nomenclature for attributes or collections thereof.

15 Claims, 41 Drawing Sheets

U.S. PATENT DOCUMENTS

| | | | | |
|---|---|---|---|---|
| 5,960,411 A | * | 9/1999 | Hartman et al. | 705/26 |
| 5,963,948 A | * | 10/1999 | Shilcrat | 707/100 |
| 5,991,735 A | * | 11/1999 | Gerace | 705/10 |
| 5,995,943 A | * | 11/1999 | Bull et al. | 705/14 |
| 6,006,251 A | * | 12/1999 | Toyouchi et al. | 709/203 |
| 6,023,679 A | * | 2/2000 | Acebo et al. | 705/5 |
| 6,041,305 A | * | 3/2000 | Sakurai | 705/5 |
| 6,209,026 B1 | * | 3/2001 | Ran et al. | 702/3 |

* cited by examiner

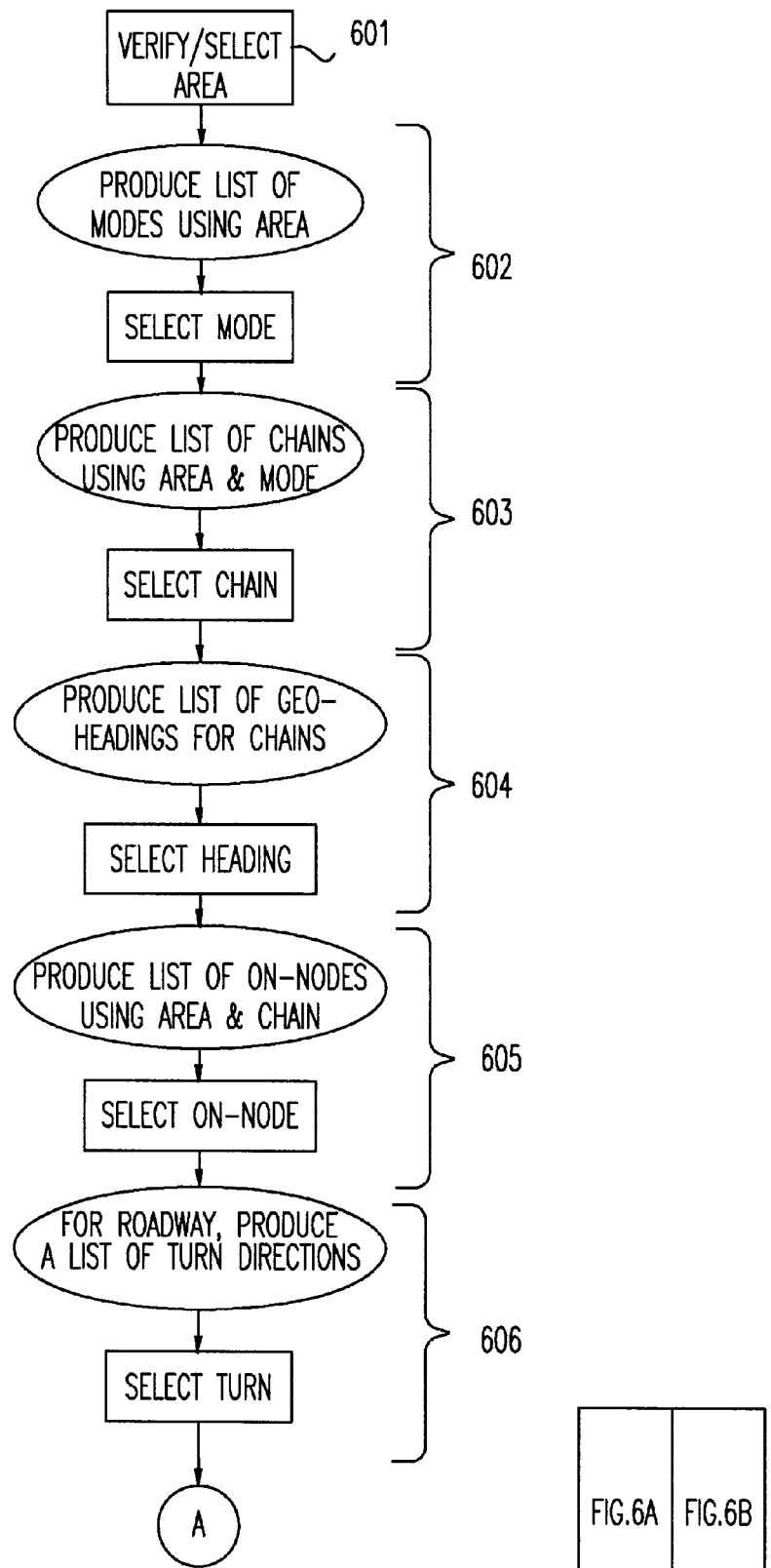
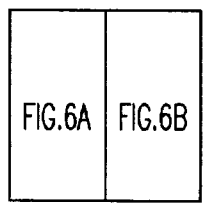
FIG.6A
FIG.6

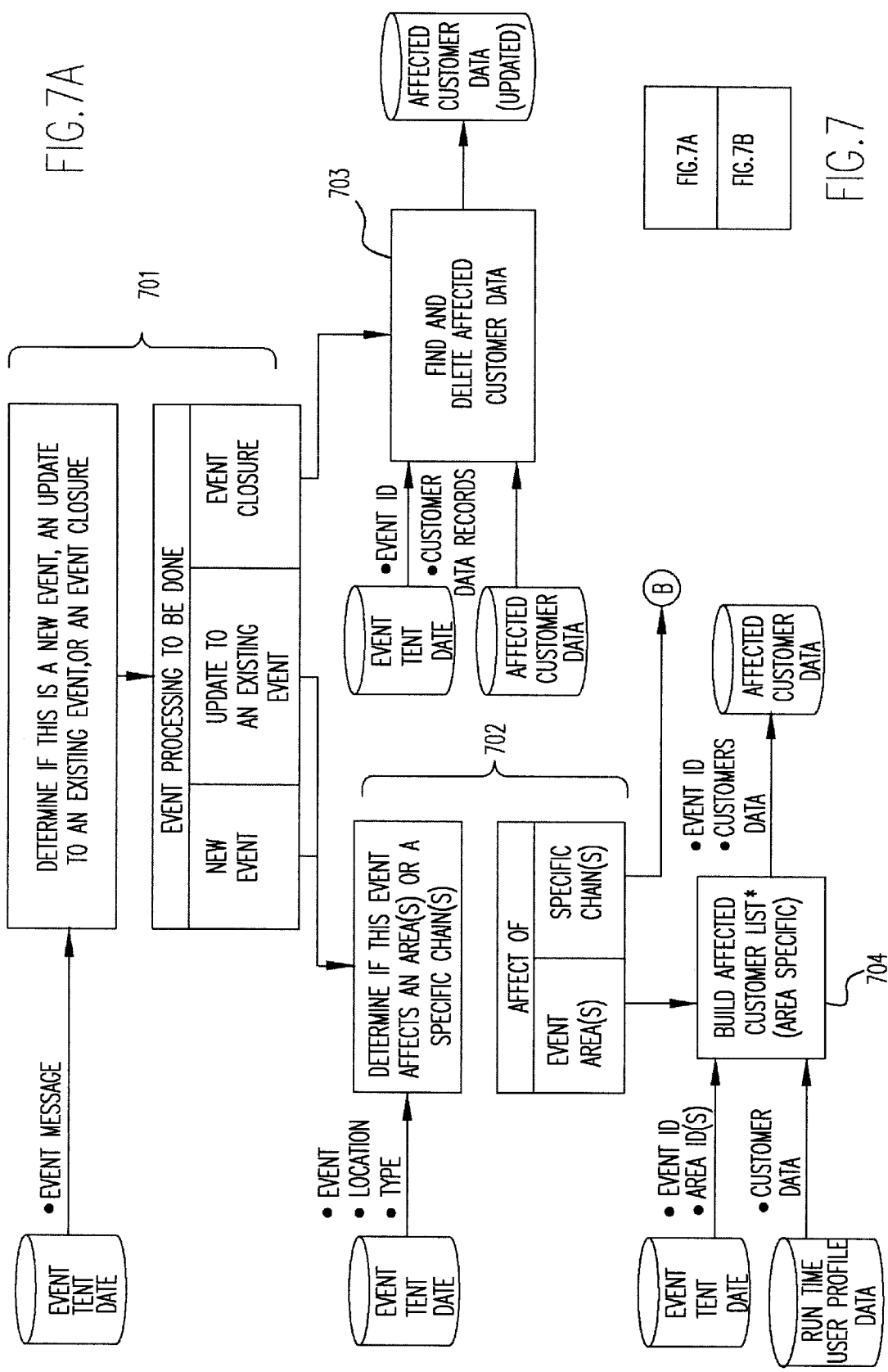

* AS AN ALTERNATIVE DESIGN TO THE ABOVE FUNCTION, DETERMINATION OF CUSTOMERS AFFECTED BY AREA EVENTS COULD BE PERFORMED AT THE TIME CUSTOMER CALLS IN. FOR THIS ALTERNATIVE, NO AFFECTED CUSTOMER DATA WILL BE BUILD OR MAINTAINED.

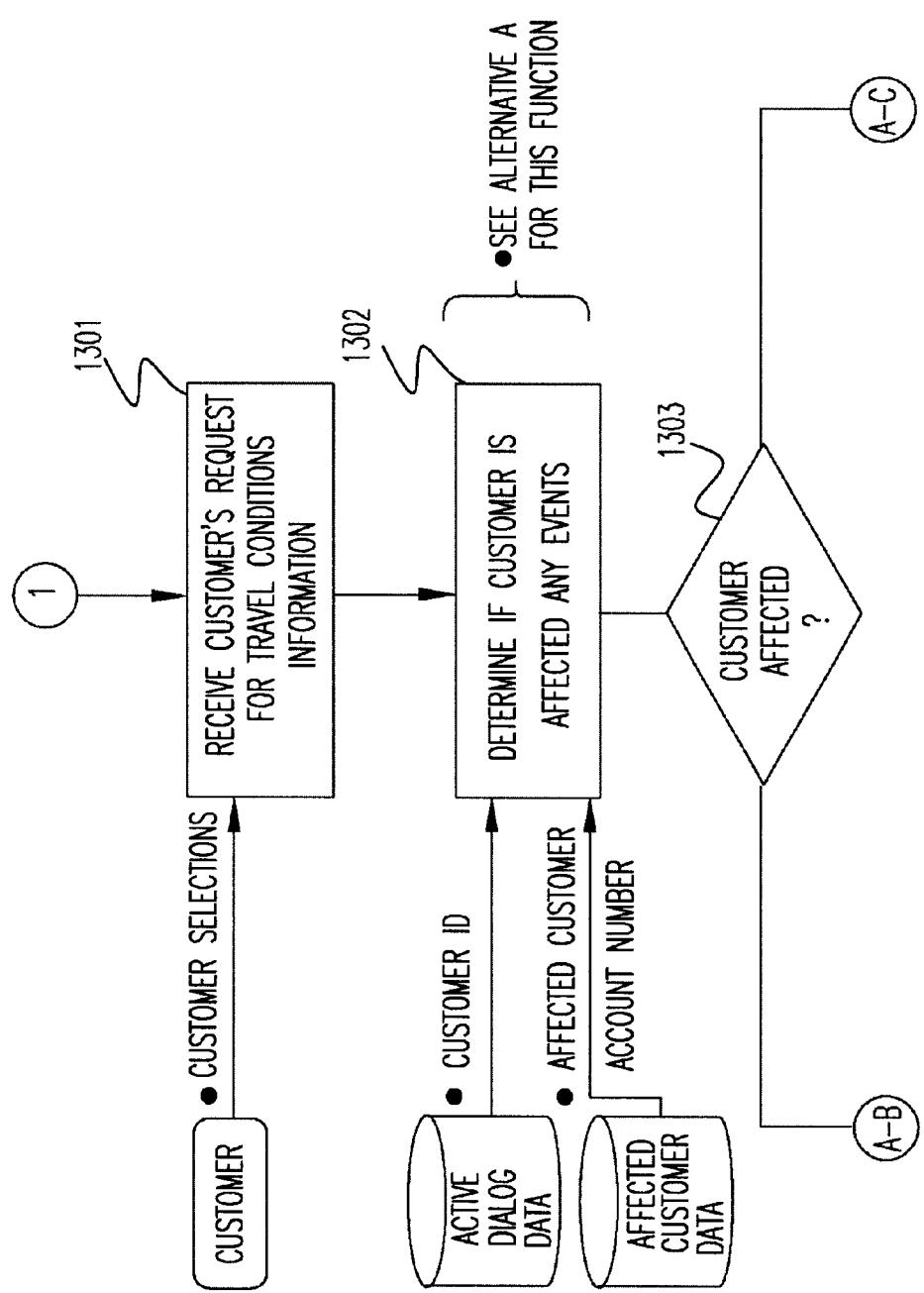

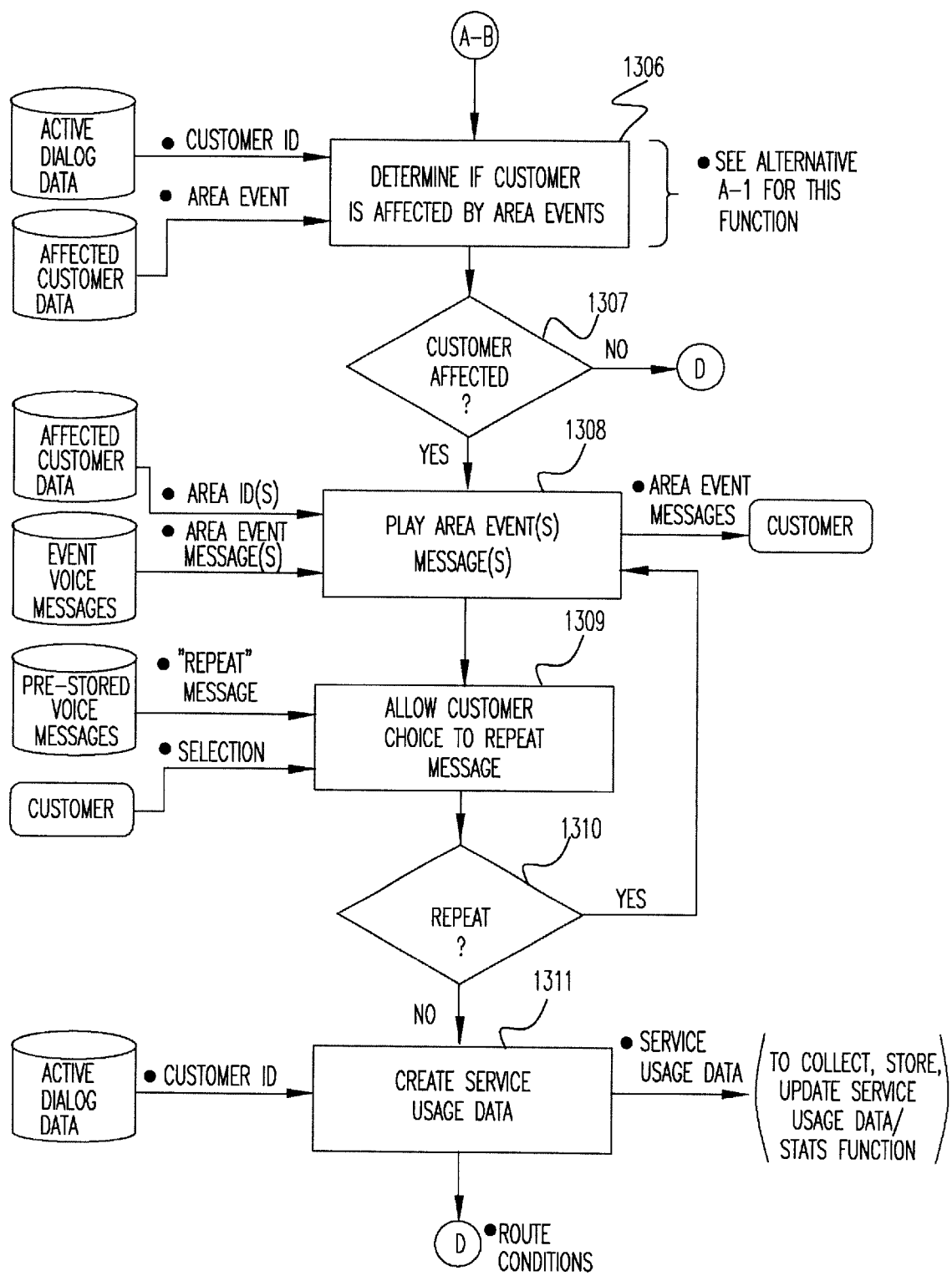
FIG. 13A-B

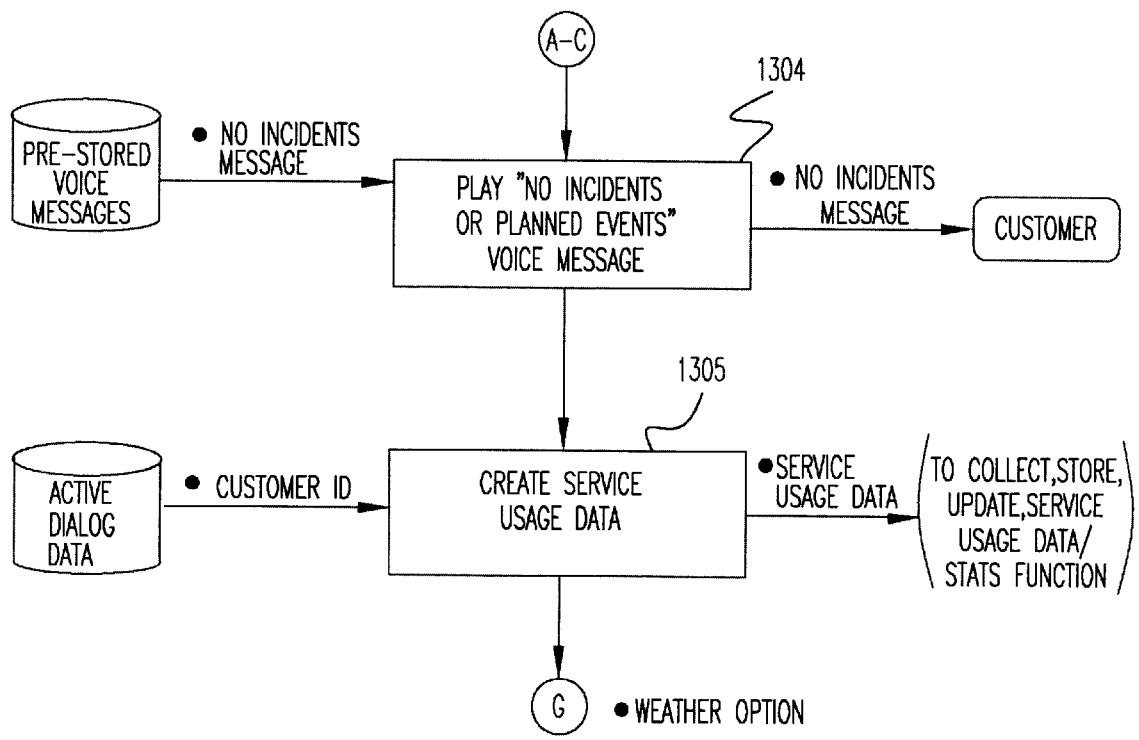
FIG.13A-C

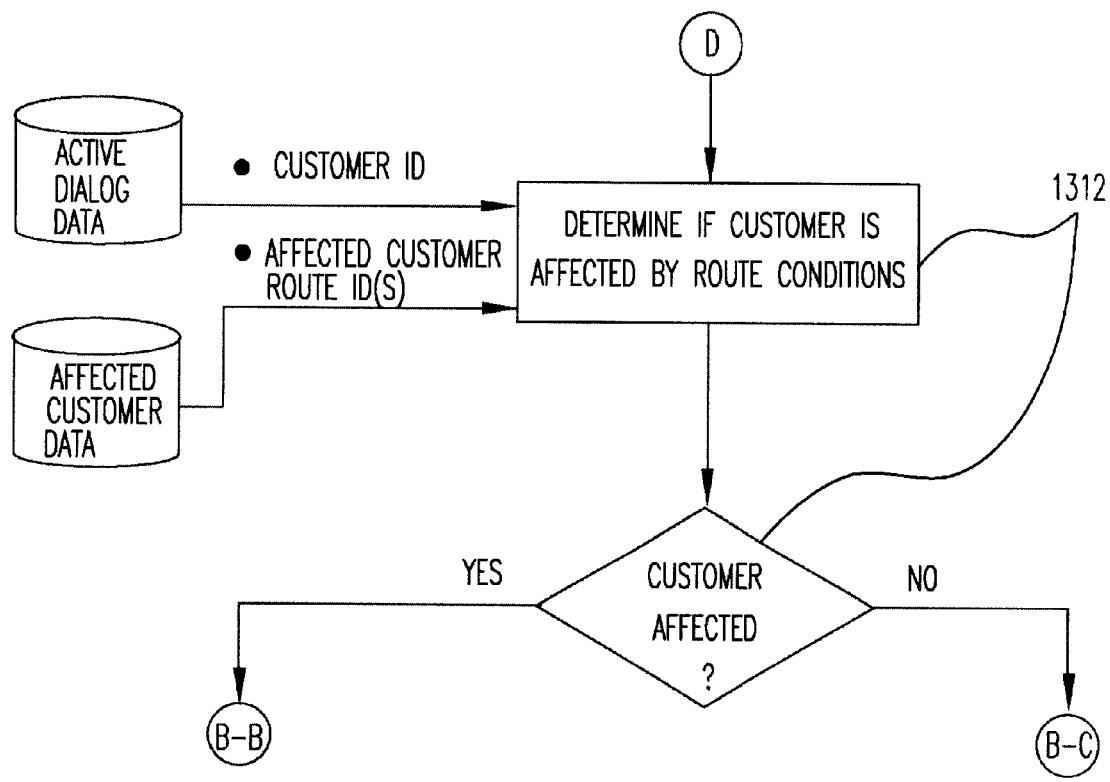
FIG.13B-A
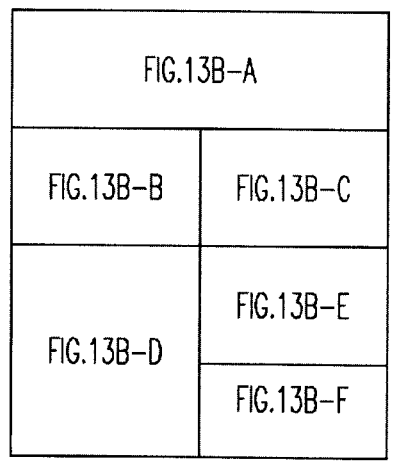
FIG.13B

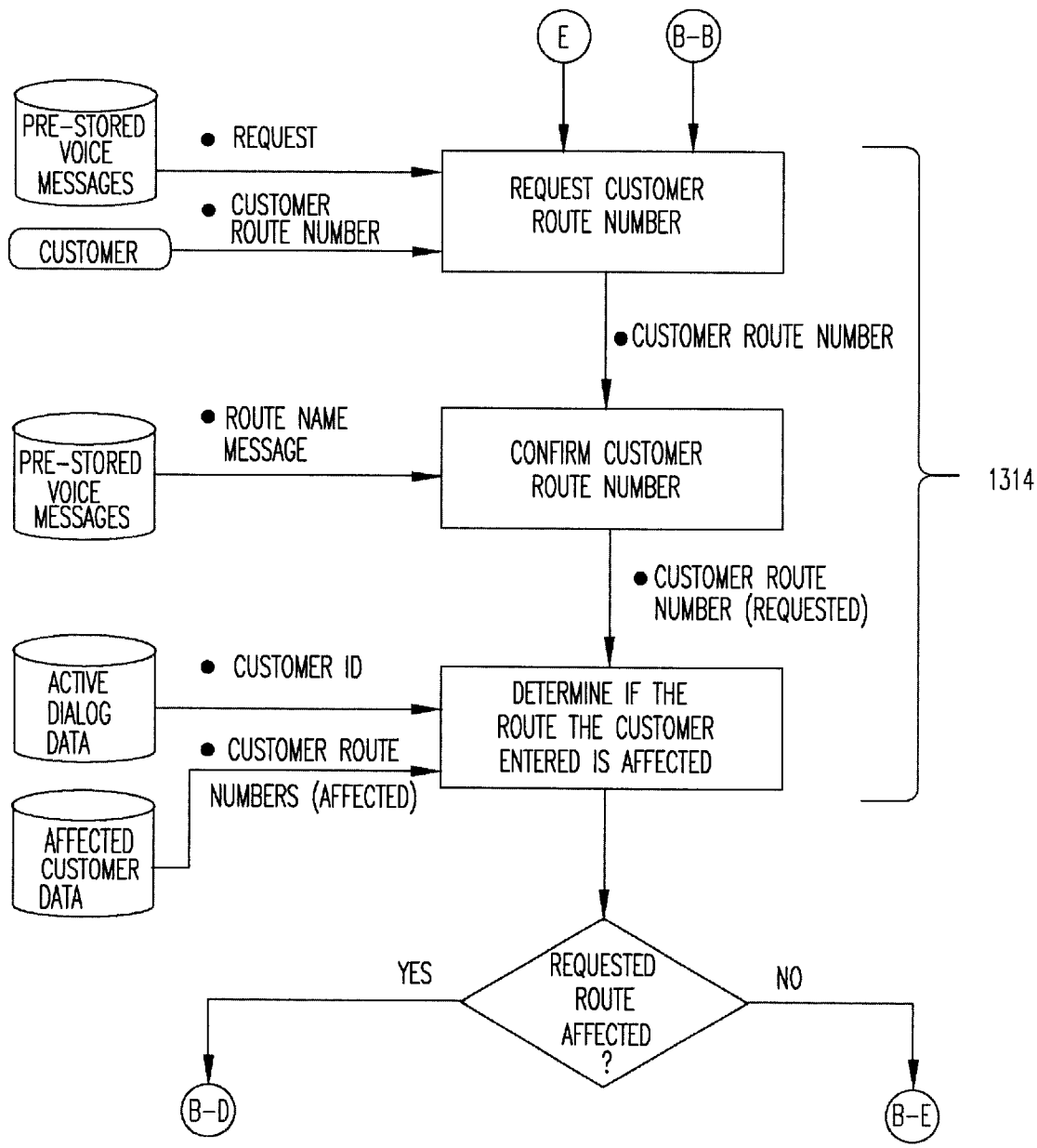
FIG.13B-B

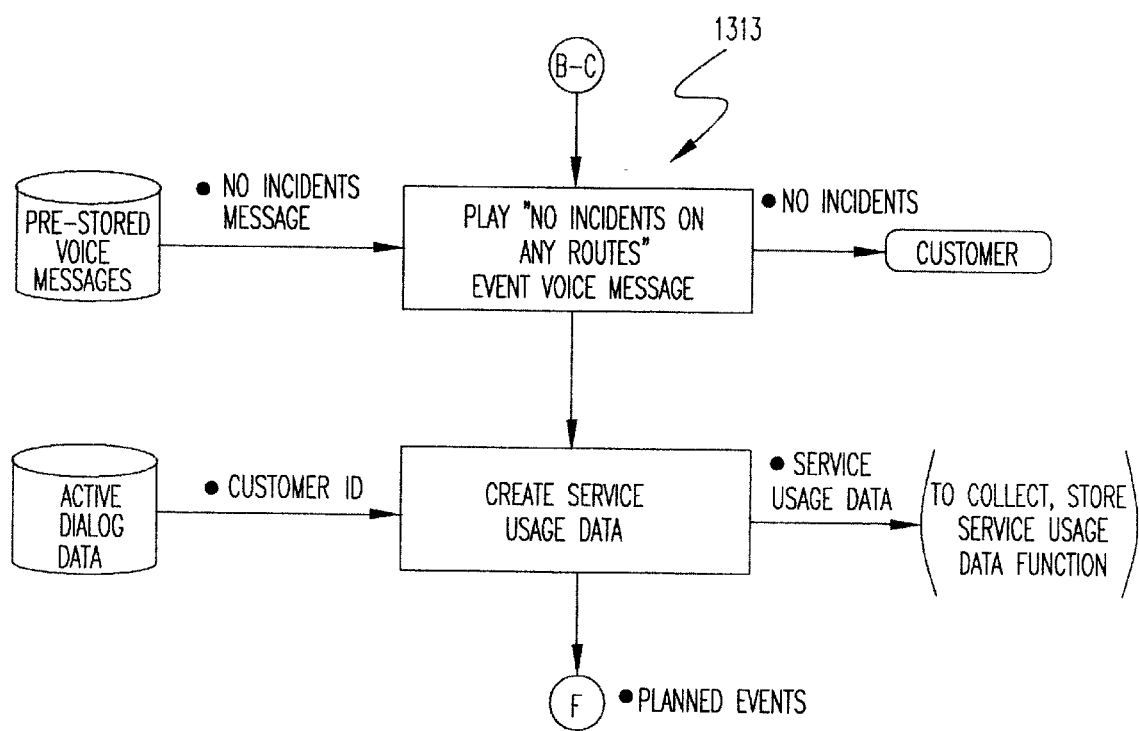
FIG.13B-C

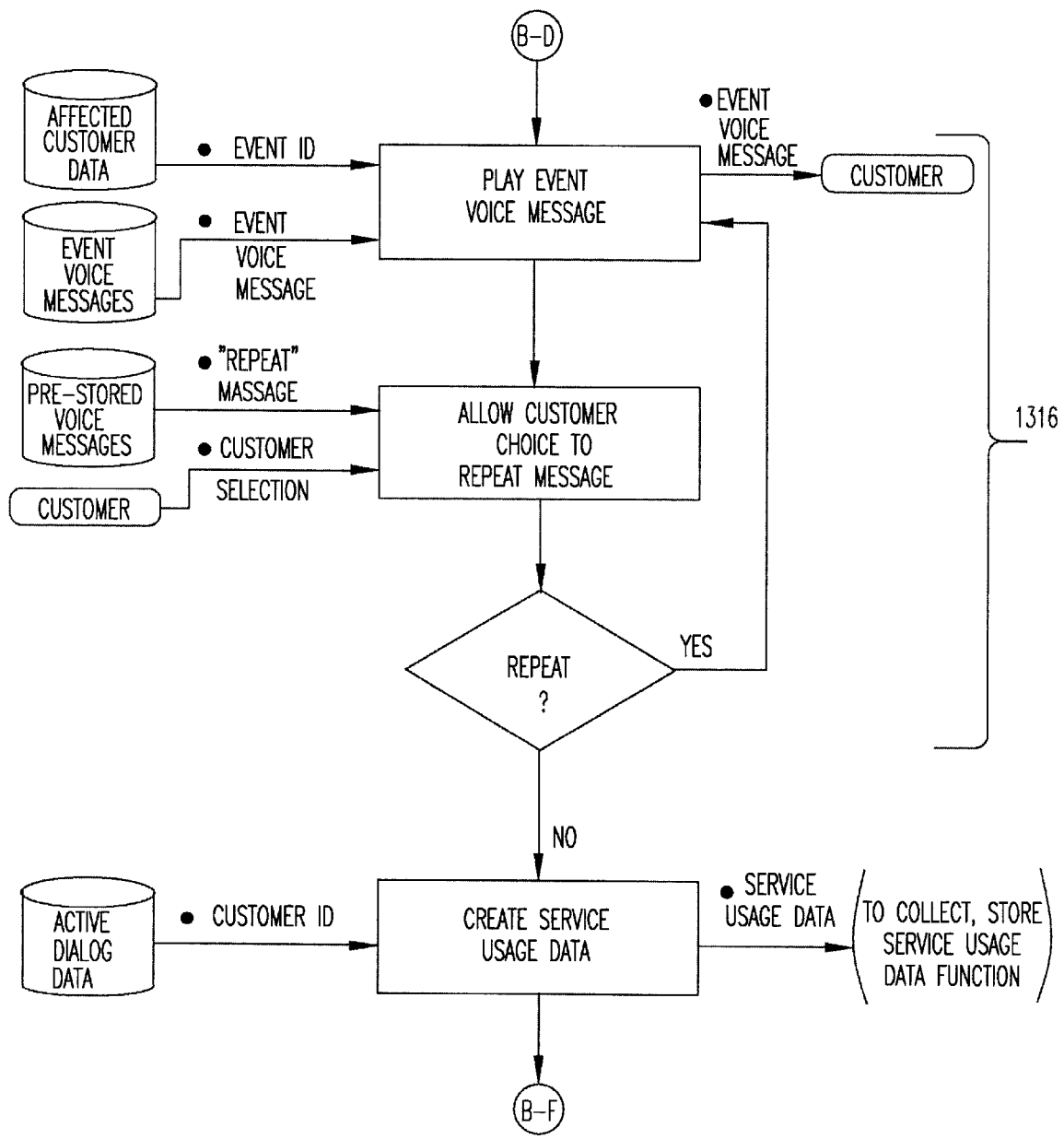
FIG.13B-D

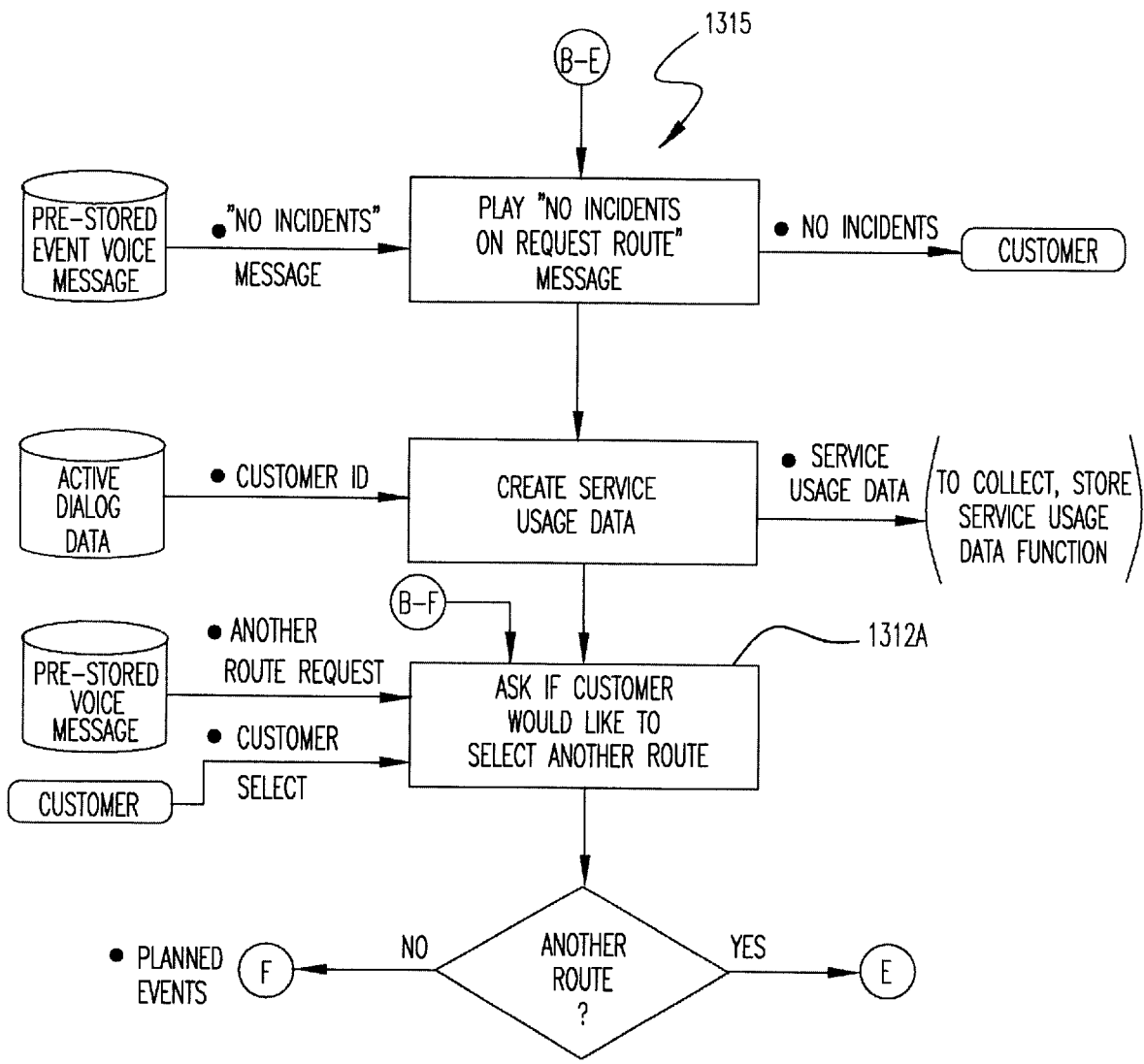
FIG.13B-E

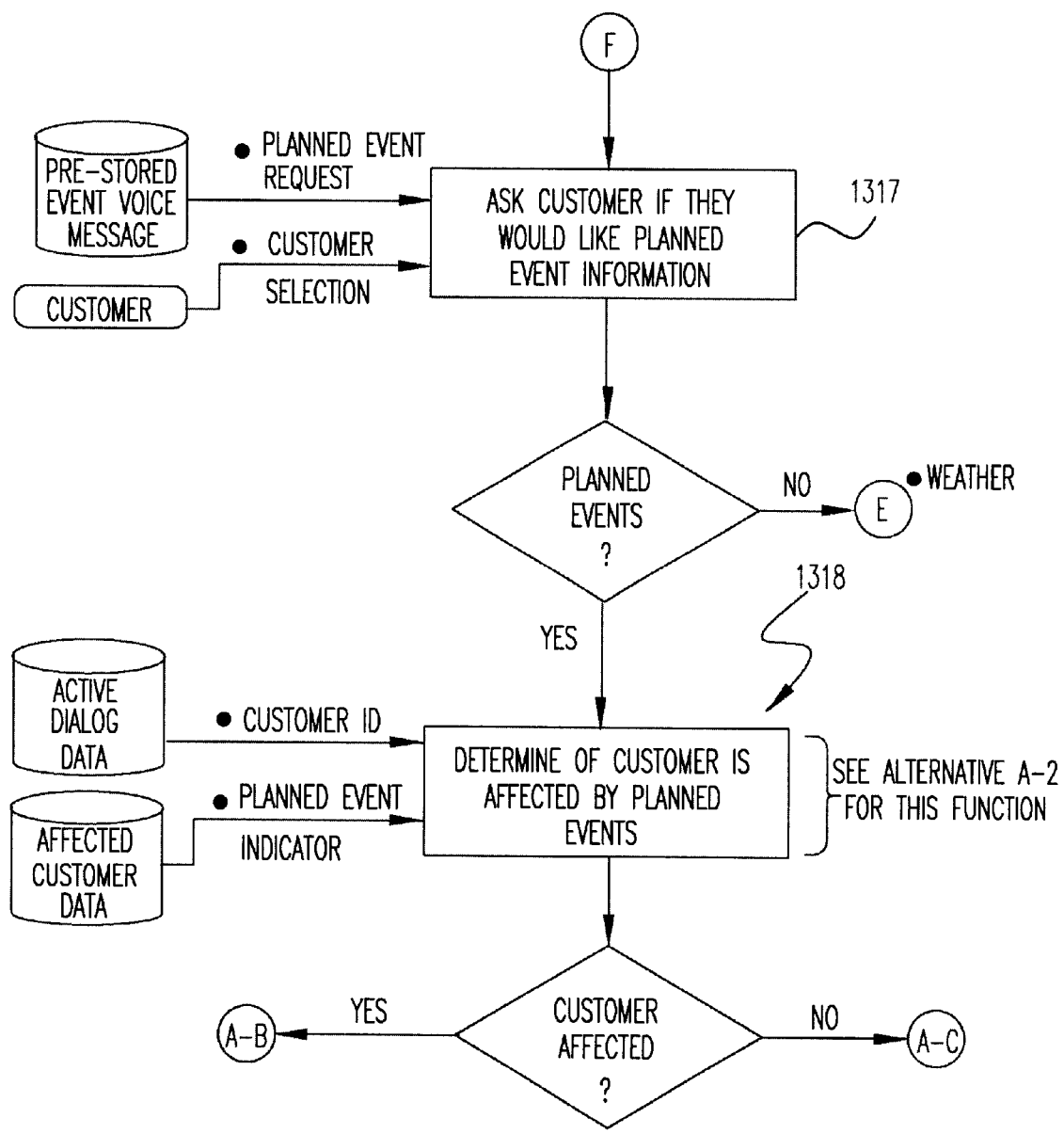
FIG.13C-A
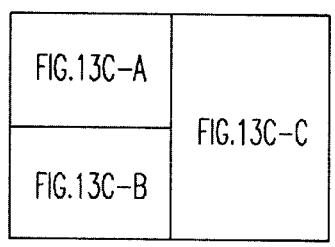
FIG.13C

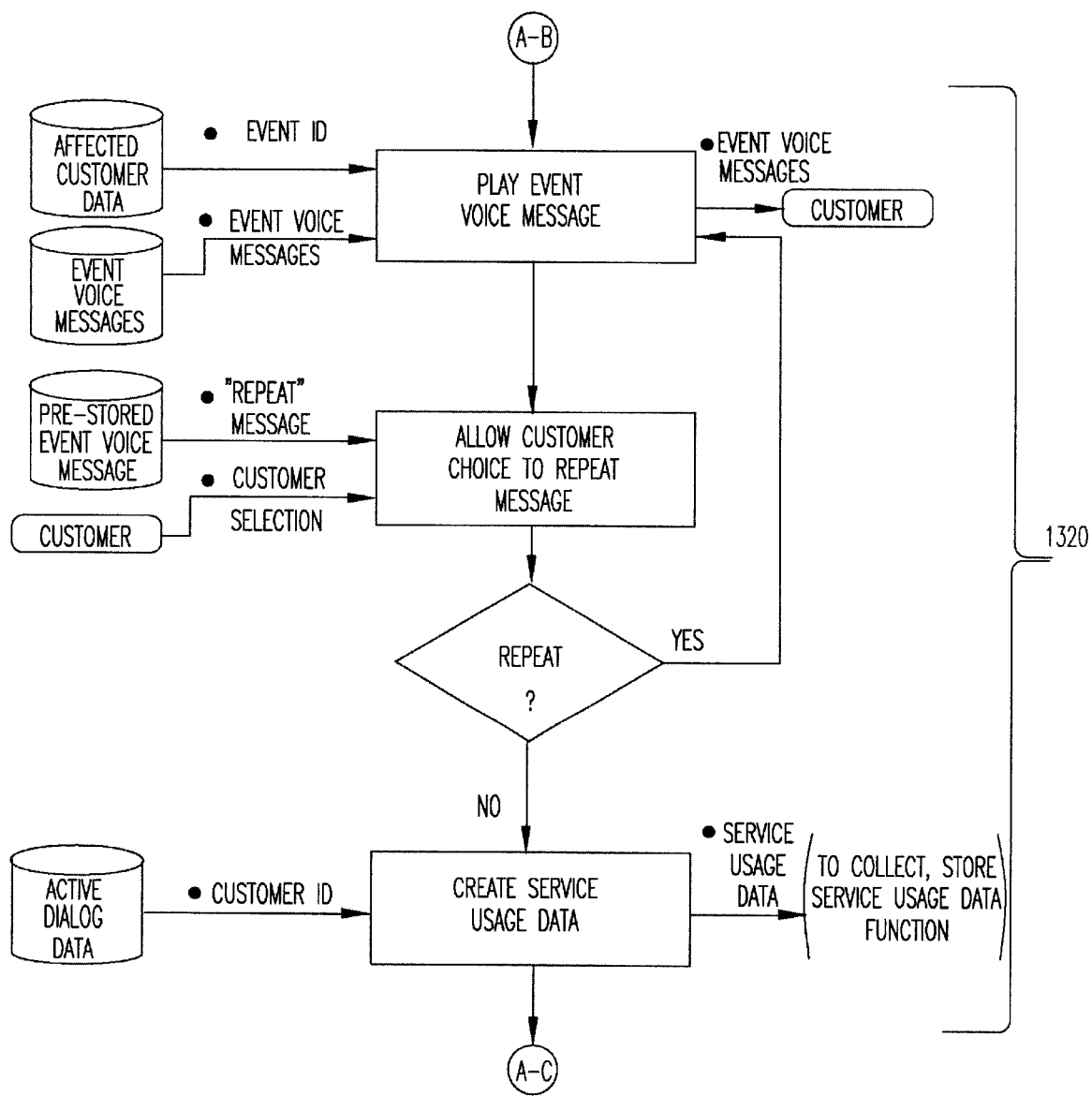
FIG.13.C-B

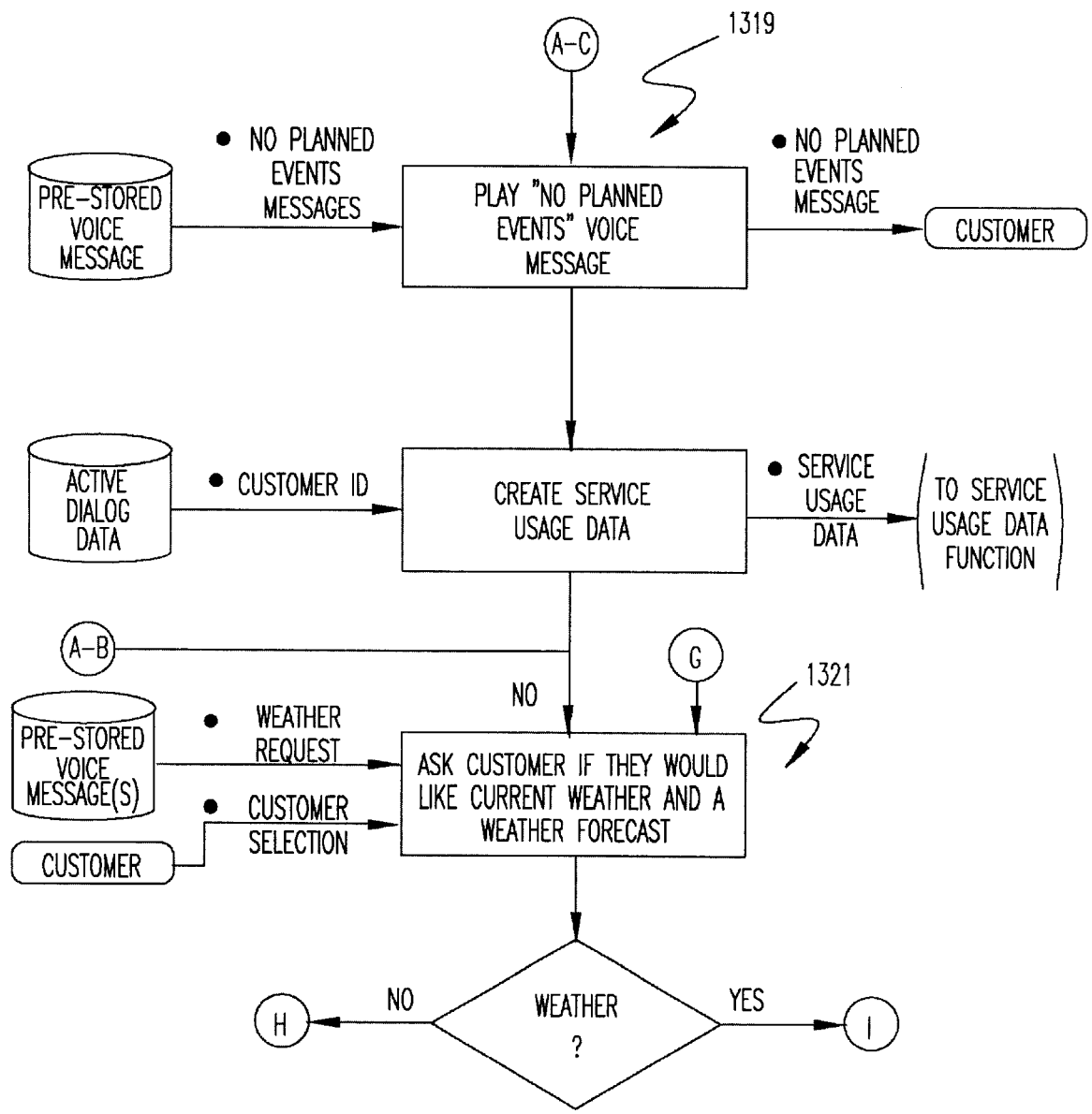
FIG.13C-C

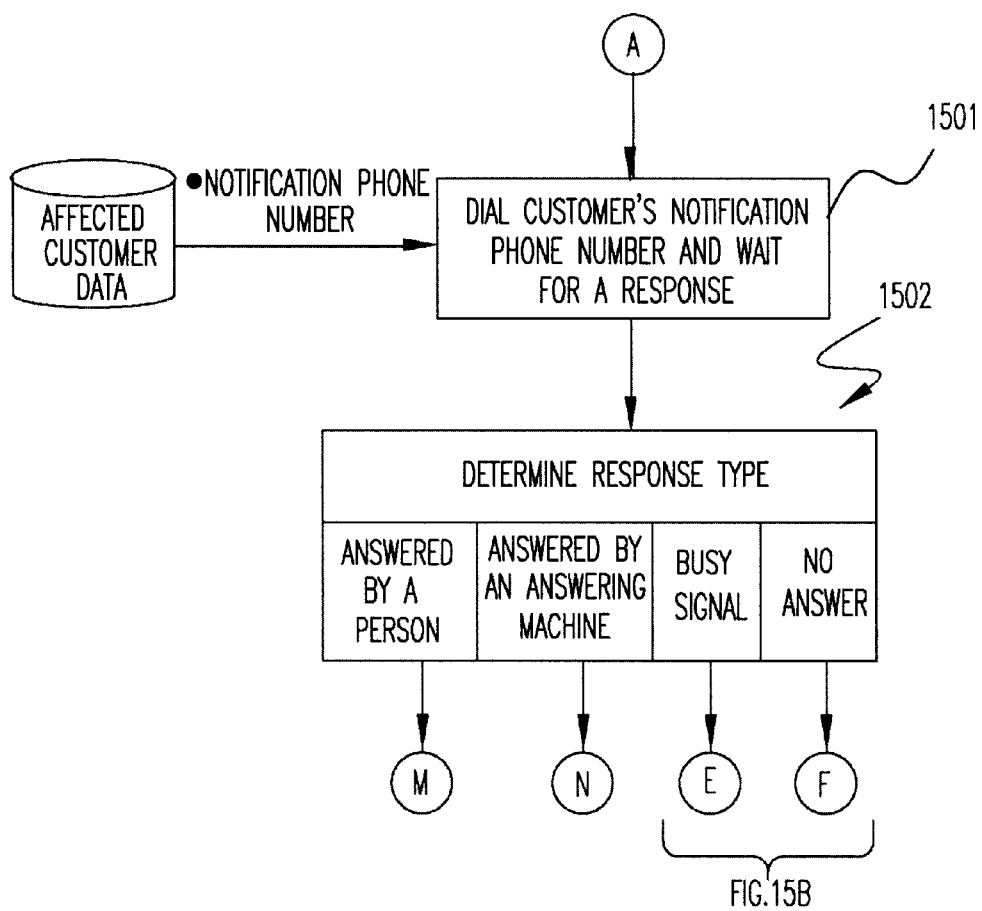
FIG.15A-A
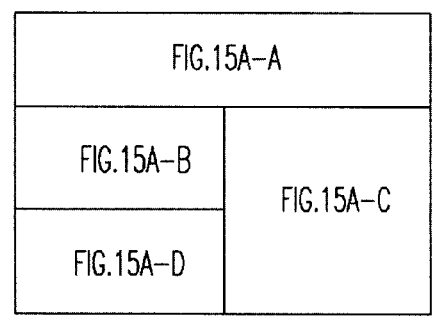
FIG.15A

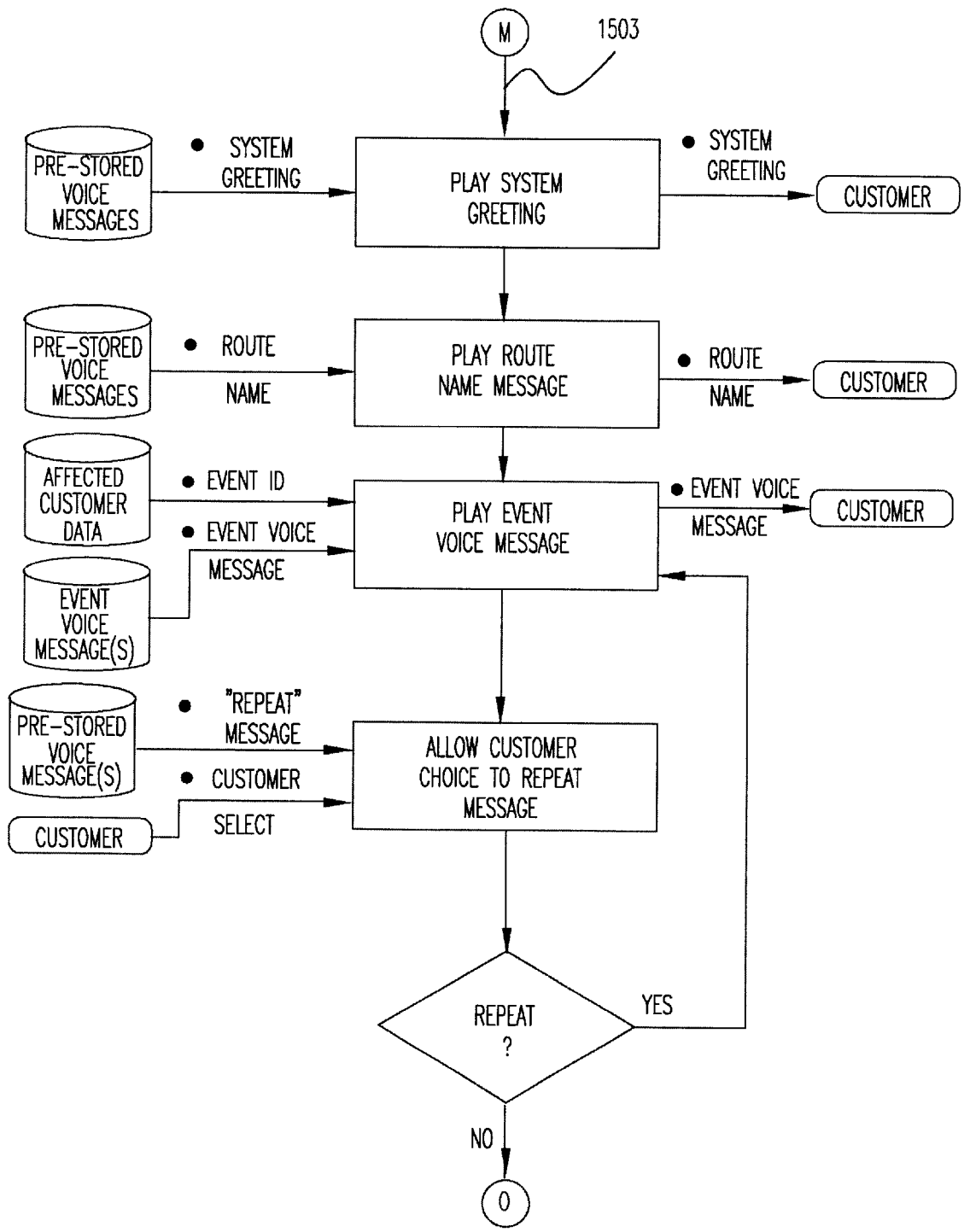
FIG.15A-B

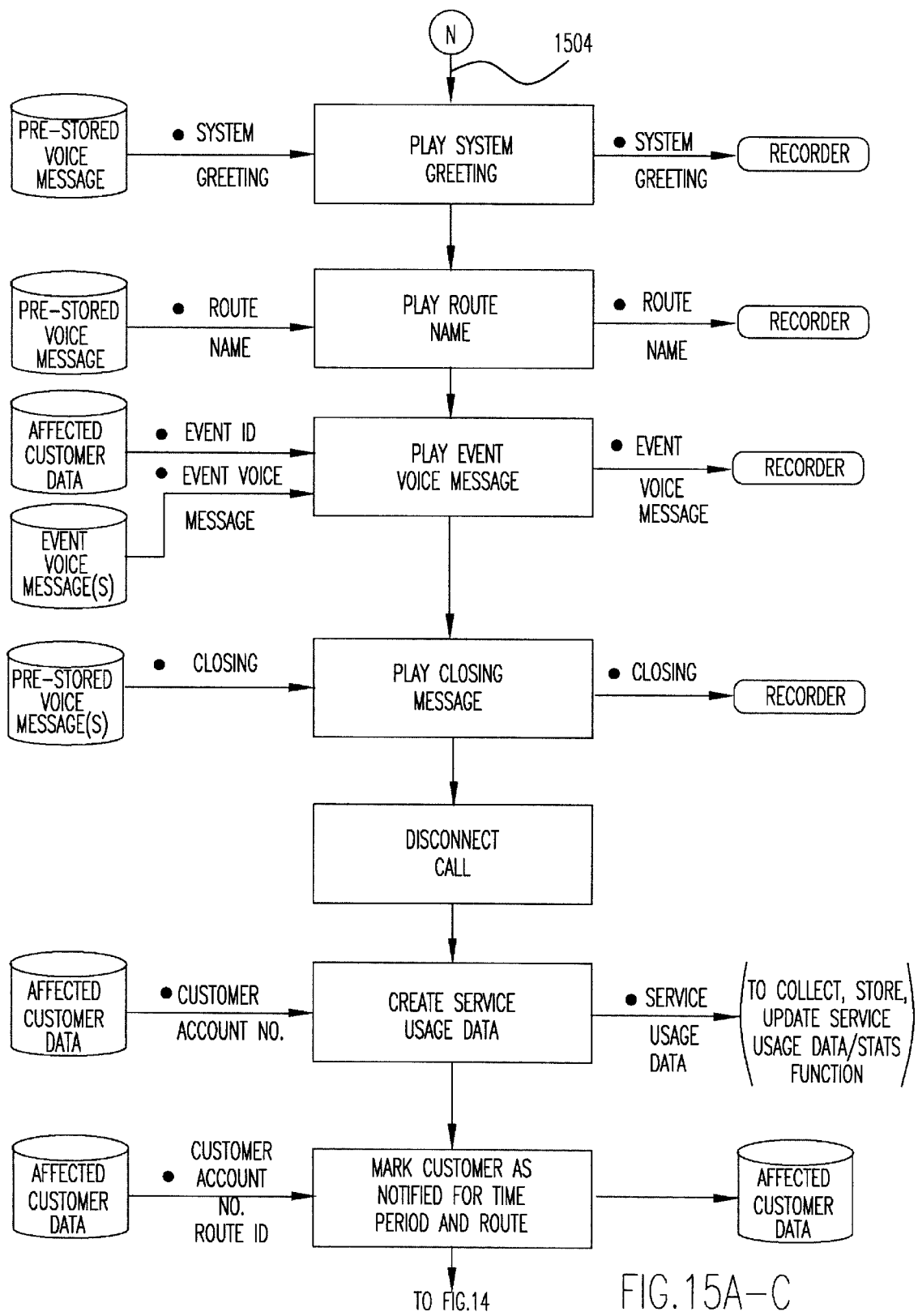
FIG.15A-C

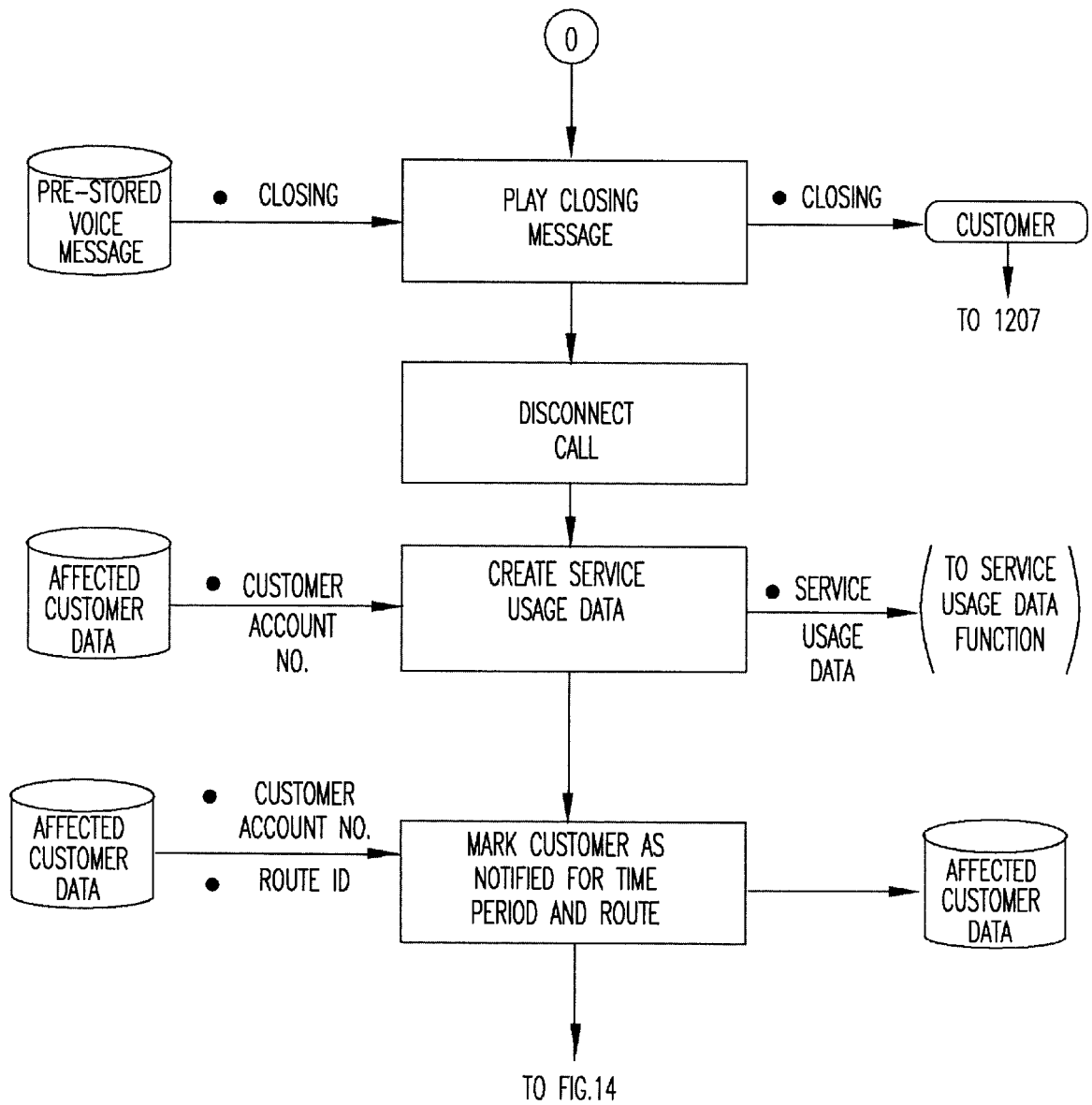
FIG.15A-D

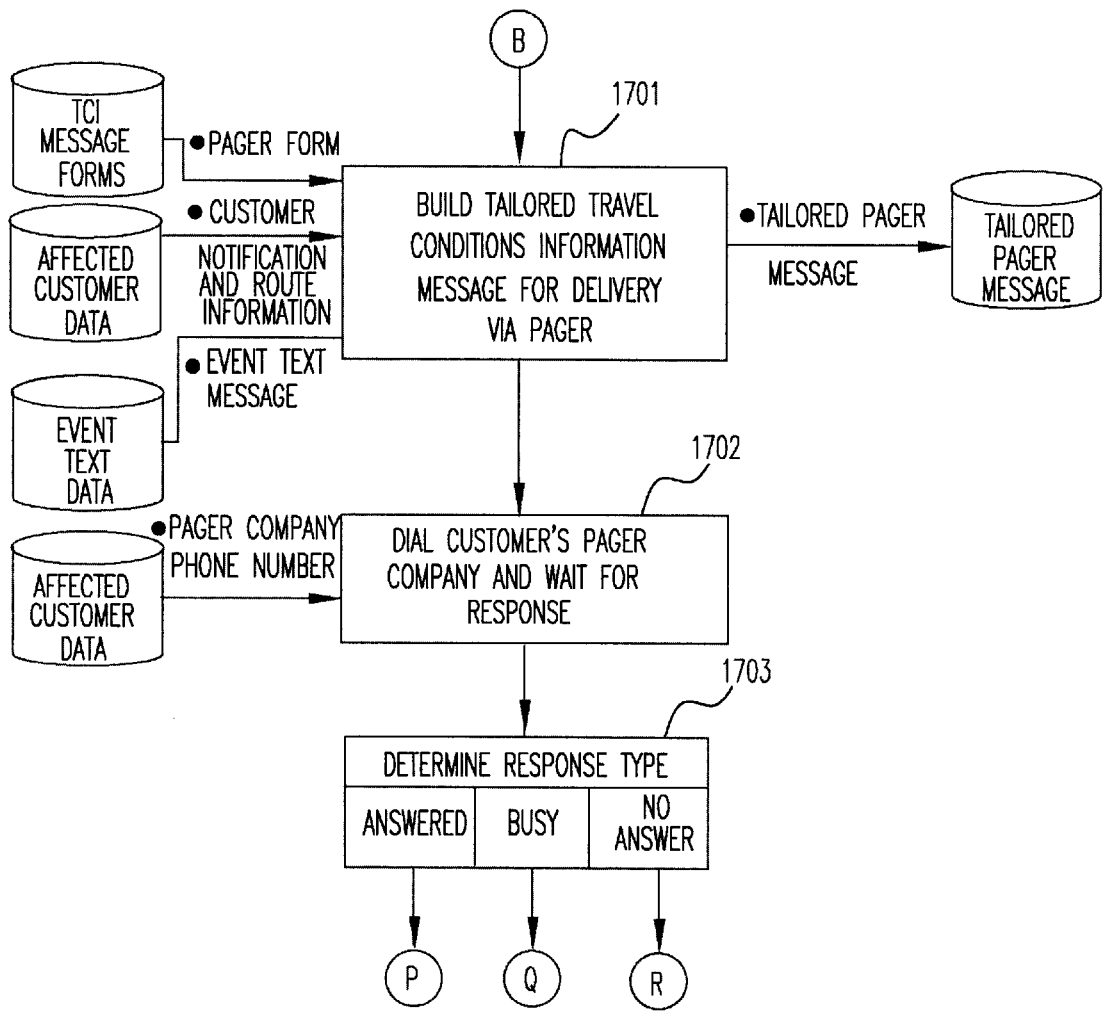
FIG.17-A
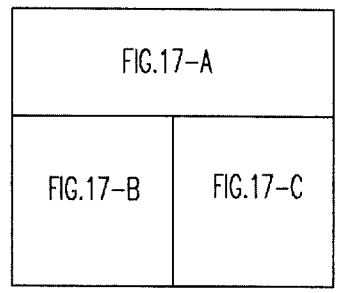
FIG.17

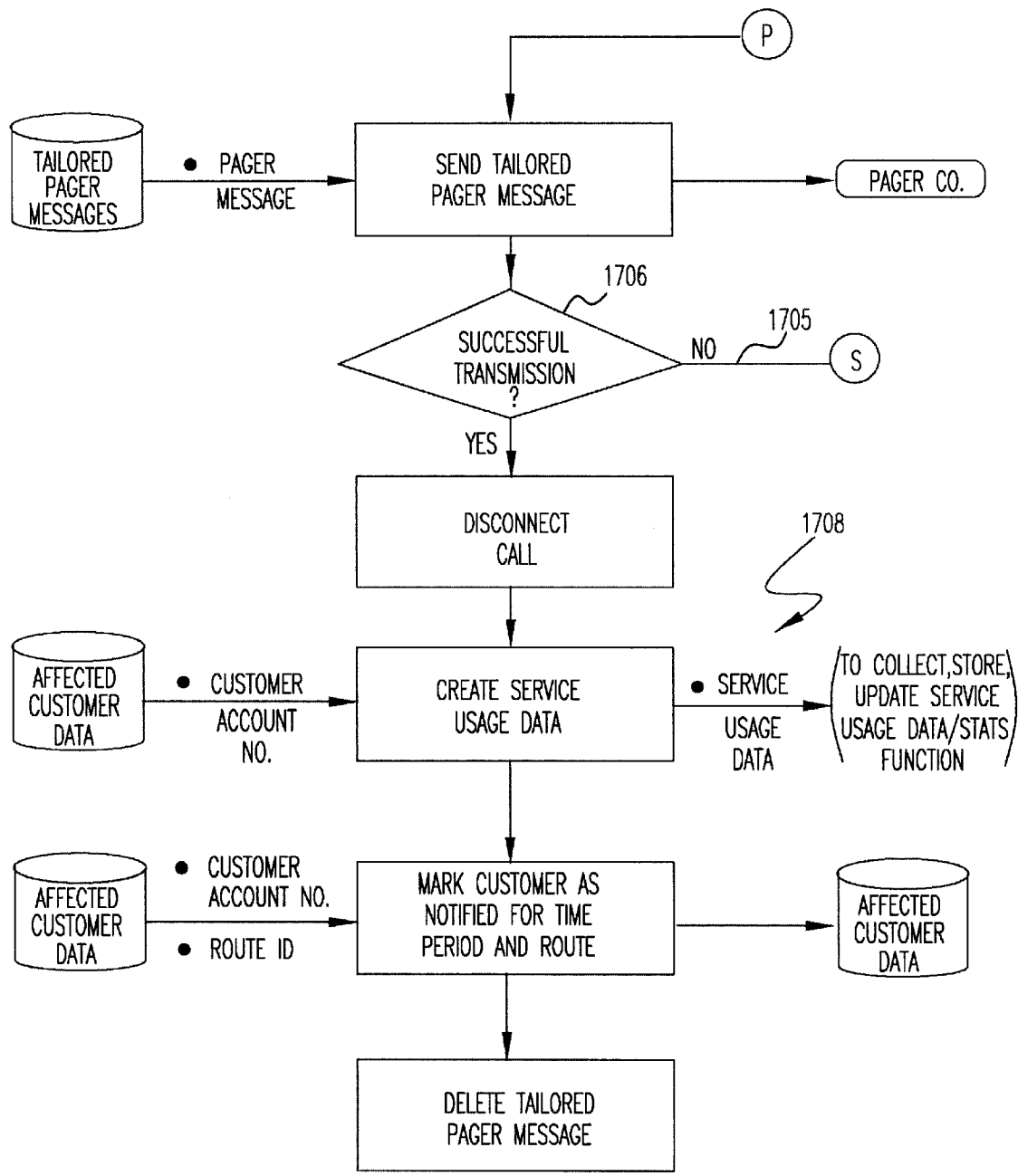
FIG.17-B

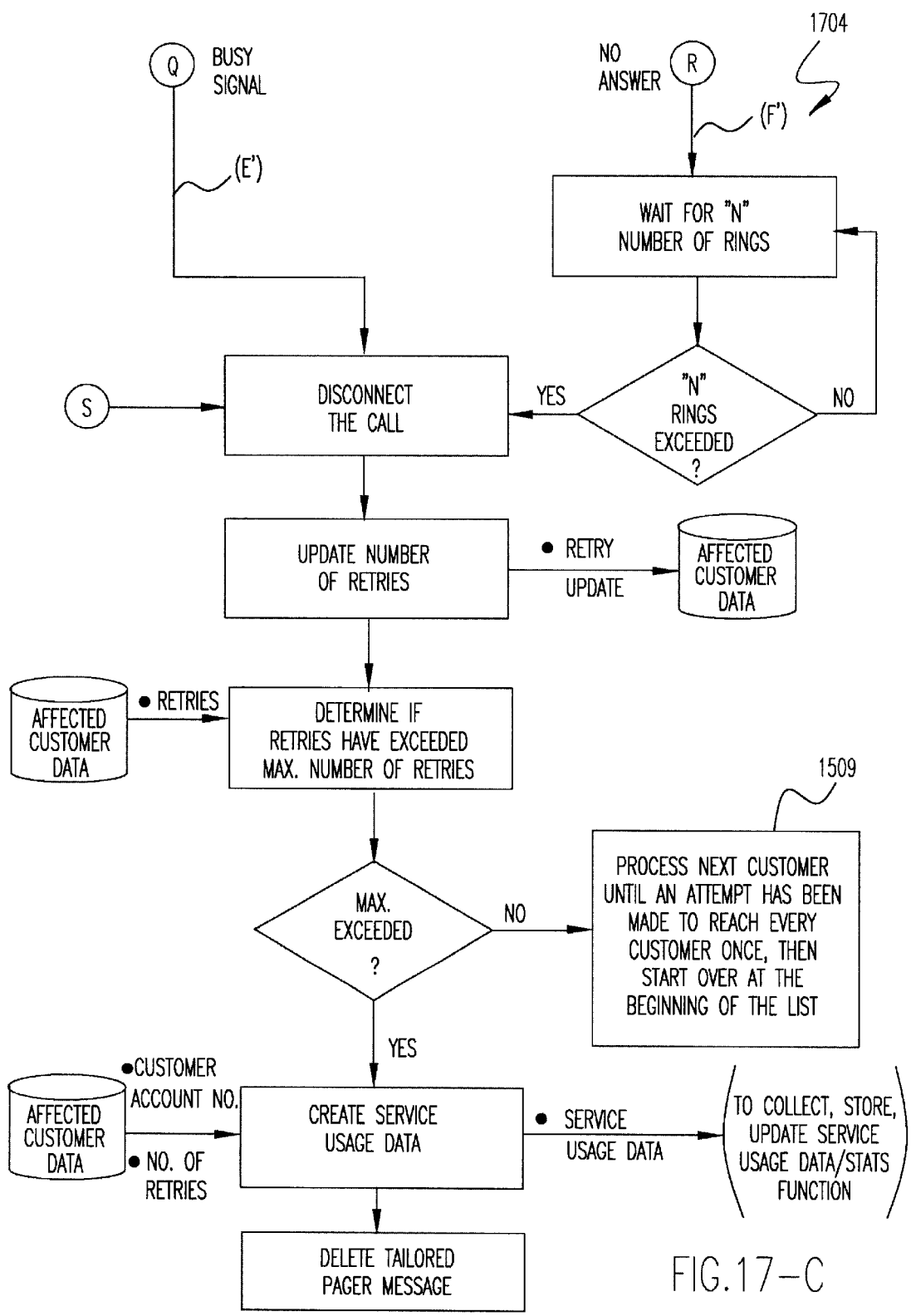
FIG.17-C

MULTI-MODAL TRAVELER INFORMATION SYSTEM

CROSS-REFERENCE TO RELATED APPLICATIONS

The present application is a continuation-in-part of a U.S. Provisional Application Ser. No. 60/045,158, filed Apr. 30, 1997, which is hereby fully incorporated by reference. Benefit of priority under 35 U.S.C. §120 is hereby claimed as to the subject matter of that provisional application which is common to this application.

BACKGROUND OF THE INVENTION

1. Field of the Invention

The present invention generally relates to information collection and distribution services and, more particularly, to data processing systems which may be used to facilitate performance of such services, particularly for collection and distribution of travel condition information.

2. Description of the Prior Art

A multitude of generalized travel conditions information is currently available ranging from television and radio broadcasts, to telephone customer information services. The shortcoming of broadcast information is that it is not personalized to the end user's specific needs. Currently, individual travelers are is forced to expend time and energy sifting through and assimilating the potentially vast amount of information provided by broadcasts to determine if any disruptions have occurred along their route(s) of interest, and what effects may impact their own personal travel. Even when substantial effort has been expended, there is no assurance that needed information will have been collected even though it may be available from one or more sources that may be accessible. Some telephone customer information services attempt to provide a more tailored form of the broadcast travel conditions information by providing predetermined routings for the customer to choose from. Although this type of service provides a smaller volume of traveler information to its customers, it still requires the end user to perform filtering and assimilating of the provided information.

One of the ever-present problems in metropolitan areas is access to real-time travel conditions information that is relevant to an end user's intended travel routes. Real-time access to this information is often limited by conventional broadcast dissemination methods such as radio and television. Information is packaged for use by the masses and therefore contains general information, little (or none) of which may be relevant to any given end user using the multi-modal transportation system in a given region. Research has indicated that travel condition information that is not filtered against their personal multi-modal routes of travel and relevant to their times of travel, so they can make informed travel decisions is not particularly useful, particularly in urban areas. Further, end users do not want to be limited to the use of one or two particular dissemination/communication devices which may not be available or convenient when up-to-date travel conditions information is needed and/or relevant information is available.

In summary, what travelers want is 1) real-time travel conditions information, 2) specific to their multi-modal routes, 3) for any combination of travel modes, 4) whenever they need it, 5) wherever they need it by means of appropriate and available communication links, and most importantly, 6) when they would be affected by it. In this latter regard, some users want to receive such information only when regular travel would be affected by the travel conditions. Such qualities would allow travelers to reduce the effort currently associated with obtaining travel conditions information and to adjust their travel routes according to current conditions on their intended routes.

Previous implementations of similar concepts have focused on decomposing the transportation grid into preselected roadway segments that travelers can access via predetermined codes. While this approach may be an improvement over general broadcast methods, it does not address multi-modal travel (e.g. using different forms of transportation), may cause the end user a significant amount of involvement in obtaining the information and does not support the concept of limiting notification to only times when travel conditions affect the user. Further, previous implementations of similar concepts have not been fully generalized to communication systems by which the user may wish to receive information.

Nor do previous implementations provide independence from proprietary communication protocols or public geographic referencing methods which may expand the geographic area to which a report may be directed beyond the area of interest to a user and thus include unneeded, irrelevant or misleading information. For example, travel conditions associated with a particular street or highway or mode of transportation may only exist on a portion of the route to be travelled using a particular mode of transport which is not included in the traveller's preferred route.

Accordingly, it is seen that prior approaches to limitation of travel information provided to a user have been insufficiently specific to the user's needs and insufficiently flexible in regard to communication media which may be employed or the route and possible modes of travel which may be of interest to the user and do not support full flexibility of choice in travel routes, conveyance and other choices which may be made by a traveller in the process of expeditiously reaching a destination.

SUMMARY OF THE INVENTION

It is therefore an object of the present invention to provide a system and method for matching travel condition information to a user's needs and preferred communication media and utilization thereof, such as automatic notification or call-in/information on demand.

It is another object of the invention to provide a system and method for supplying travel condition information to a user for evaluation of travel options at points at which decisions can be made in the process of reaching an intended destination.

It is a further object of the invention to provide a system and method for filtering real-time travel condition information in regard to traveller identity, destination, route, mode of conveyance and/or intended travel time for limiting information presented to a user.

In order to accomplish these and other objects of the invention, a method is provided for selecting information from a database containing data having attributes and messages corresponding to the data and communicating the selected information in accordance with attributes of interest to a particular user, including the steps of registering attributes of interest in accordance with identification data for each user, constructing a filter from the attributes of interest to said user, filtering data input to the database to construct a list of user identifications corresponding to an attribute of the data, and retrieving and communicating to a user in the list a message corresponding to an attribute of interest to the user corresponding to data input to the database.

BRIEF DESCRIPTION OF THE DRAWINGS

The foregoing and other objects, aspects and advantages will be better understood from the following detailed description of a preferred embodiment of the invention with reference to the drawings, in which:

FIGS. 13A, 13B, 13C and 13D are flow charts illustrating the preferred operation of a telephone-based call-in function for information distribution in accordance with the invention, FIGS. 15A and 15B are flow charts illustrating a preferred operation in accordance with the invention for conducting automatic subscriber notification, FIG. 17 is a flow chart illustrating a preferred operation in accordance with the invention for distribution of information by wireless pager.

DETAILED DESCRIPTION OF A PREFERRED EMBODIMENT OF THE INVENTION

Figure 1:
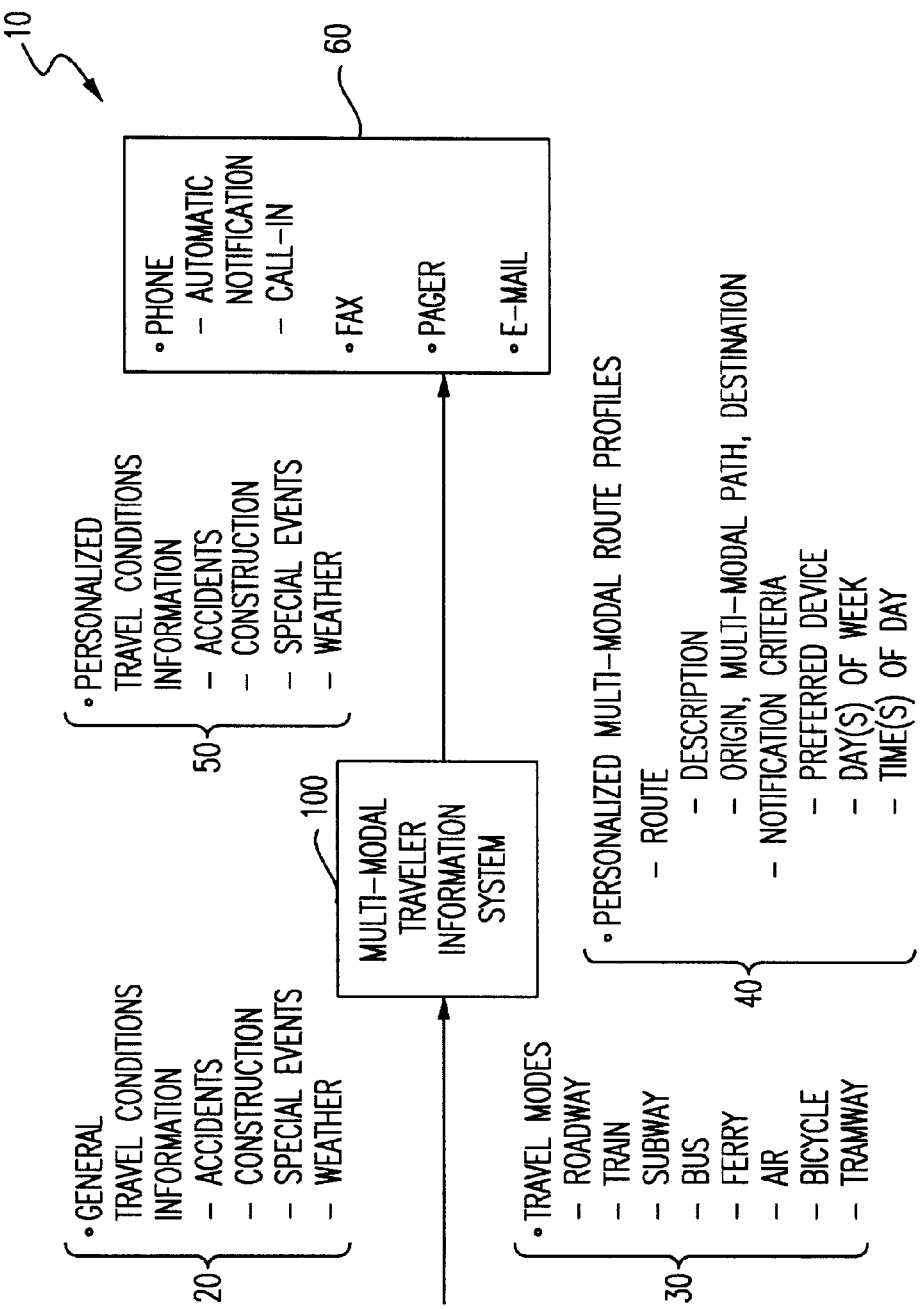
FIG. 1 is a system block diagram representation in accordance with the present invention.

Referring now to the drawings, and more particularly to FIG. 1, there is shown a high-level block diagram reflecting the environment 10 of the invention. It should be understood that the environment of any traveler information will necessarily be similar to that of the present invention although, as indicated above, known systems generally require substantial human intervention and/or cannot accommodate all of the information sources 20 in regard to numerous travel modes 30 or control input data 40 or communication media 60 accommodated by the present invention to provide personalized reports 50 even though various known systems may utilize numerous portions of the environment illustrated.

Further, it should be recognized that a substantial information infrastructure 20, 30 exists and is available for use by known systems as well as the present invention and it can be anticipated that the information infrastructure will expand in information content in the future as will the number and variety of available communication media. Accordingly, it is to be understood that no portion of FIG. 1 or any other Figure herein is admitted to be prior art in regard to the present invention and that the portions of the information infrastructure and communication media illustrated and discussed should be considered as exemplary and that the invention is not limited thereto. It should also be understood that, while the preferred embodiment of the invention is employed for development of personalized reports of travel condition information 50 and will be described below in connection therewith, the principles of the invention are applicable to the reporting of other types of information, as well.

Specifically, as shown in FIG. 1, the multi-modal travel information system 100 in accordance with the invention receives real-time travel condition information from an information infrastructure 20 and preferably includes, for example, information concerning accidents, construction, special events (planned or unplanned) and weather information. The information, as received, may or may not be correlated with travel modes 30 and some degree of correlation, such as railroad or tramway conditions which are generally unique to those travel modes, or weather conditions which affect all modes of travel except subways, may be inherent in the data.

The Multi-Modal Traveler Information System (MTIS) 100 significantly reduces the traveler's burden and frustration with the additional and often irrelevant information reported by known systems through dissemination of portions of the generalized travel conditions information 20 based upon their personalized multi-modal profile input thereto, as depicted at 40. This personalized multi-modal profile would contain such items as the traveler's name, preferred travel mode(s) (e.g. roadway, bus, subway, rail, ferry, air, tramway, etc.), primary and alternate travel route(s), travel time(s), notification time window(s) during which travel is anticipated, and preferred information delivery device(s) (e.g. telephone (wired & wireless), pager (one-way & two-way), e-mail, facsimile, Internet, Intranet, in-vehicle device, etc.), collectively depicted at 60. It is with this personal information 40 that the system 100 is able to construct a filter that provides the end user with personalized travel conditions information.

Dissemination of personalized information is provided by means of any end user device that is compatible with transmission of real-time voice, video or digital message information (e.g. telephone (wired & wireless), pager (one-way & two-way), e-mail, facsimile, Internet, Intranet, in-vehicle device, etc.). For devices that support two way communications, such as the telephone, Internet and two way pagers, end users may request personalized information at any time. For all devices, the end user may have the system notify them automatically according to a set of notification criteria such as time of day, information thresholds (e.g. depth of snow, total length of anticipated delays, total travel time, required arrival time, etc.), and the like.

The invention does not depend on any unique dissemination device, but rather provides for personalized information to be disseminated across any and all compatible devices to support the traveler's desire for freedom of device choice. Therefore, the present invention does not rely on any proprietary communications protocols or non-public geographic referencing methods, but rather provides open communications and geographic referencing methods to ensure the broadest application of the invention and broadest availability to travelers. On the contrary, the invention employs an open modular architecture which enables the timely delivery of travel conditions information over many delivery devices (e.g. telephone (wired & wireless), pager (one-way & two-way), e-mail, facsimile, Internet, Intranet, in-vehicle device, etc.).

The preferred implementation of this invention for dissemination of personalized travel conditions information (accidents, congestion, delays, travel times, construction, weather, special events and road surface conditions) to travelers uses any combination of travel modes (e.g. roadway, bus, subway, rail, ferry, air, tramway, and the like). Travel conditions information specific to a traveler's multi-modal travel routes would be immediately available to those who have registered their multi-modal travel routes and notification criteria 40 with a service provider. Preferably, information content, communications protocols, and information geographic referencing would all be in accordance with existing industry standards and evolving Intelligent Transportation Systems (ITS) open systems standards. Source providers of general travel conditions information 20 would include traffic operations centers, traveler information centers, or any other information service provider (e.g. news wire service) who provides the real-time travel conditions information in industry and open systems standard formats. Again, the invention does not rely on any particular communication protocols or non-public geographic referencing methods.

As will be discussed in greater detail below, new customers register with a service provider (via communication with a customer service representative or the personal Internet interface, generally indicated at 40 of FIG. 1). Data elements are collected/captured for their personal profile for uniquely identifying the traveler, their personal travel route(s) and their preferred notification criteria and communication device(s) for information delivery. Each route defined within the profile contains a description, origin, multi-modal path and destination. Customers may register particular route(s) for automatic notification. The notification criteria includes the preferred delivery device (e.g., telephone, fax, pager, e-mail, etc.) and the day(s) of week and time(s) of day that travel on the route is anticipated.

Generalized travel conditions information is filtered by filters which are built by the system 100 according to the information provided in the pre-stored customer profiles. The filtering process occurs in multiple stages. In the first stage of the filtering process, as will be discussed in detail below, the location of the travel condition is compared with the routes in the customer profiles to determine which customers may be affected. For those customers that are affected and have registered for automatic notification, the filtration process continues with a comparison of the customer's notification time window and the expected duration of the travel condition. Once the determination has been made that the customer's designated notification time window falls some time during the expected duration of the event, a determination is then made as to when to notify this customer about the travel condition. The final stage of the filtering process is to determine the customer's notification preference (e.g. telephone (wired & wireless), pager (one-way & two-way), e-mail, facsimile, Internet, Intranet, in-vehicle device, etc.).

The invention provides two modes of operation: user on demand request and automatic notification. The user on demand request operation is driven by the end user call-in requesting current travel conditions applicable to one of their pre-stored routes. Upon receiving the customer's choice of pre-stored route(s), the system will determine if there are any current reportable travel conditions that impact the selected route. Any reportable travel conditions which impact the selected route are then reported to the customer. Automatic notification is driven by the occurrence of a travel condition. A travel condition enters the system which triggers the event/profile filtering process as described above, and results in a customer being notified by means of their preferred notification device.

Figure 2:
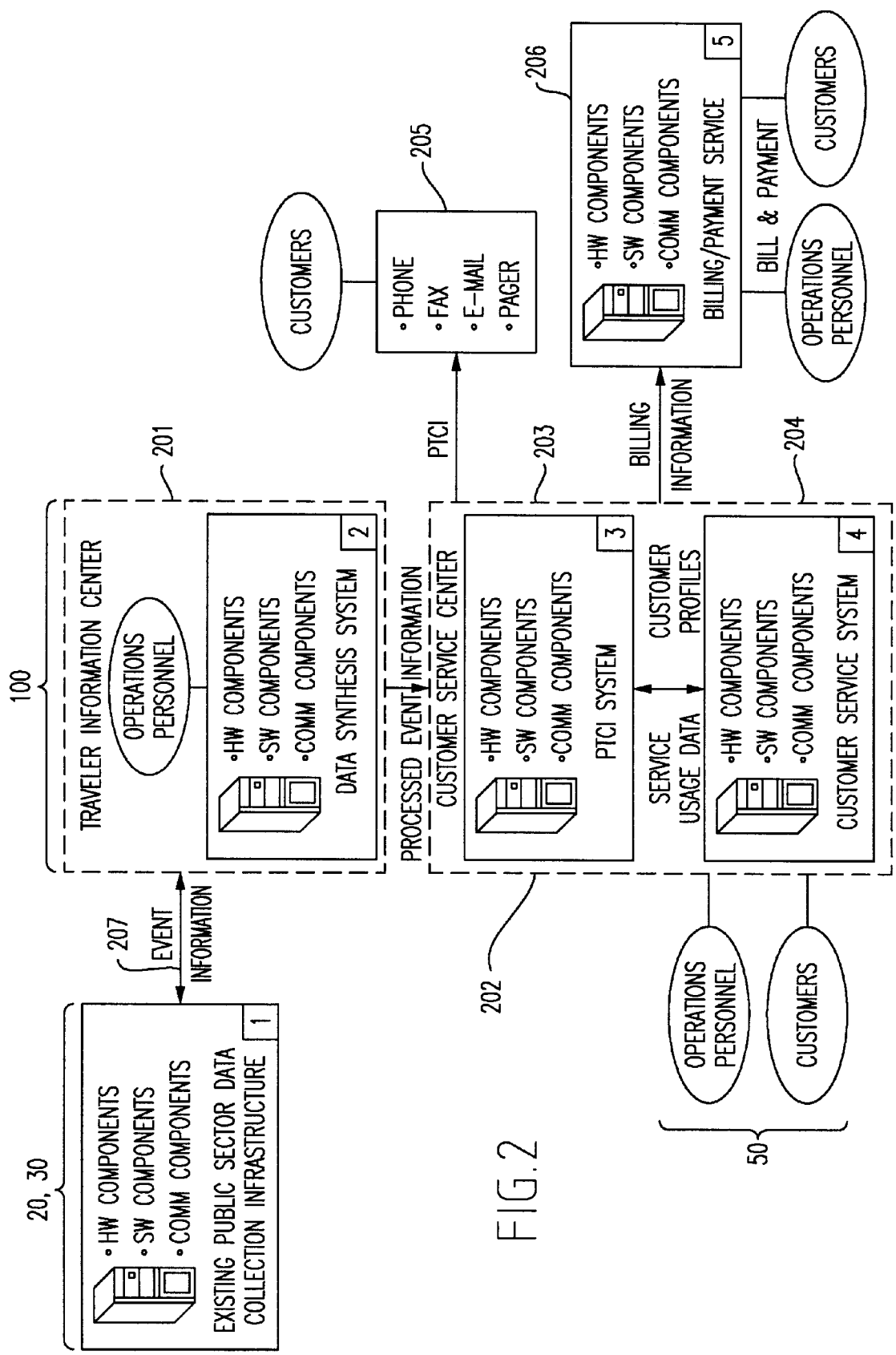
FIG. 2 is a block diagram representation showing the multi-modal transportation information system (MTIS) physical attributes in accordance with the present invention.
Figure 11:
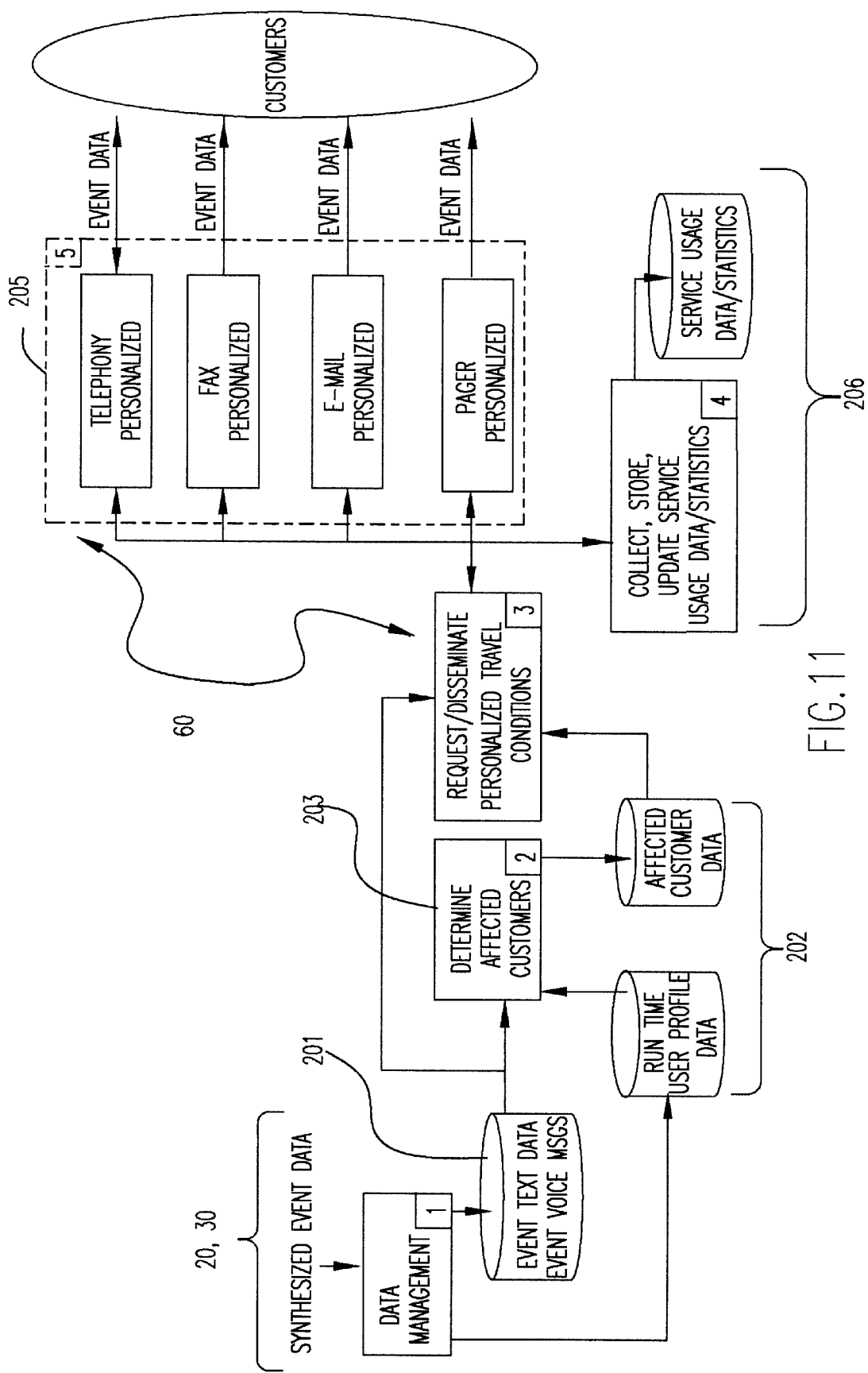
FIG. 11 is a block diagram of the MTIS preferred functional architecture.

Referring now to FIGS. 2 and 11, the physical architecture of the invention will be discussed. The depiction of the invention in FIG. 2 is similar to that of FIG. 1 except that the depiction is articulated at the system level. Similarly, the depiction of the preferred system architecture shown in FIG. 11 is the same as shown in FIG. 2 but somewhat more detailed and differently articulated in illustration in a hardware oriented manner. Specifically, the physical environment of the traveler information system in accordance with the invention consists of the following conceptual components:

1. A data collection infrastructure 20,
2. A data synthesis system 201,
3. An information filter system 203,
4. A customer service center 204,
5. A communications media interface 205, and
6. A billing and payment service provider 206.

The information filtering system 203 provides personalized travel conditions information (PTCI) for each customer and the customer service center 204 (not separately shown in FIG. 1) maintains the customer profiles used for building personalized filters and maintains a record of customer usage and billing information. The information filtering system 203 and customer service center collectively form a traveller information center (TIC) system 202 which, together with the data synthesis system 201, corresponds to the MTIS system 100 of FIG. 1.

The data collection infrastructure 20 is typically furnished, operated, and maintained by the public sector and is utilized for:

1. Electronically capturing travel conditions event information (e.g. incidents, construction, planned events, etc.),
2. Electronically interfacing to existing transportation systems and further providing transportation information (e.g. ATMS Systems, Transit, Signal Systems, etc.),
3. Electronically sharing transportation information among the public agencies and the TIC 202 of the invention by means of a high bandwidth communication network 207.

It should be understood that the data collection infrastructure 20 currently exists and collectively represents all sources of information which are available to a particular instance of the MTIS system 100, but which may or may not include all possible information sources from which useful information may be obtained. By the same token, it can be anticipated that the number and variety of possible information sources as well as the number and variety of information sources from which a particular instance of the MTIS system may receive information will change from time to time. Accordingly, other than as a matter of the completeness of the information available to a particular instance of the MTIS system and the completeness of the information provided on a personalized basis to customers, the specific constitution of the information infrastructure is unimportant to the principles and practice of the invention.

The data synthesis system 201 consists of a staffed operations center where the system(s) and personnel collect, fuse, and package multi-modal travel conditions information. In accordance with the invention and as will be described in greater detail below, packaging of information is principally automatic, requiring little, if any, operator intervention. This information is primarily obtained through an electronic interface including a communication link 207 to the data collection infrastructure 20 and will be electronically transmitted to the TIC 202. As will be discussed in greater detail below, the collection, fusing and packaging of information in accordance with the preferred embodiment of the invention is principally a matter of reformatting information into objects with which the information filtering can be expeditiously carried out and the management of results of the filtering operation facilitated.

More specifically, the fusing of the collected data alluded to above reflects the possibility (or likelihood) that information concerning an event or condition (e.g. the attributes thereof) may be provided from more than one source to which the MTIS 100 is connected. That is, some attributes may be available from different sources and conflicts therebetween must be resolved while all attributes which the MTIS 100 can reflect may not be available from a single source. Further, information concerning the same event should be correlated so as not to be reported as separate events.

Packaging of the data is principally a matter of articulating the data to match the objects which an instance of the MTIS system can support, for example, relating an event or condition to one or more geographically referenced objects such as a weather condition or event that may affect different routes or modes of travel or in different degree. That is, rain or an accident may affect more than one route and one or more nodes at which travel decisions can be made, as will be described in greater detail below and may have greater or lesser impact on, for example, a person travelling by car or bus (which is substantially unaffected by rain but cannot negotiate a path through stalled traffic) as contrasted with a person travelling by bicycle (which is uncomfortable and substantially more dangerous in prevailing precipitation but can generally negotiate a path through stalled traffic).

Much of the fusing and packaging of information can be done automatically by suitable comparison processing, the details of which will be evident to those skilled in the art with relatively small amount of oversight and intervention by an operator. In any event, the portion of the fusing and packaging processes done manually by an operator and the portion done by suitably programmed data processing apparatus in the information synthesis system 201 of the MTIS 100 and the details thereof are not important to the principles and practice of the invention.

For example, it is irrelevant to the principles and practice of the invention whether conflicts in data reported from different source is performed entirely under operator control or entirely automatically (e.g. by a simple algorithm which accepts only the most severe or least severe report or a more complex expert system or adaptive algorithm which may evaluate reports in accordance with past experience to develop an information value which may not exactly correspond to any report and a confidence factor in regard to that value). Automated processing with only limited operator intervention is currently preferred.

The TIC system 202 is comprised of the hardware and software to perform the following system functionality:

1. Automatically determine which customers are affected by travel conditions events based upon information filtering 203 in accordance with customer route profiles stored in the customer service center 204,
2. Disseminate the transportation information, personalized by filtering, through the telephone and facsimile (e.g. by means of an Interactive Voice Response Systems), pager, e-mail (via Delivery Device Servers) and the like at interface 205, and
3. Collect service usage statistics/data for use in customer information filtering and billing, including interfacing to a customer service center 204 and financial institutions and billing services 206 for data exchange purposes.

The customer service center (CSC) 204 is a manned and operational center where the following functionality will preferably be provided for the MTIS customer set and/or their service:

1. A Customer Profile Entry system which provides customers with the ability to subscribe to the personalized (e.g. profile-driven) services offered by the TIC. The functions at these workstations may be performed by Customer Service Operators when called by a traveler or automatically by transfer of suitable data over a network or the like. Travelers may call to initially subscribe to the service and/or to later modify an existing profile. These profiles contain information on the customers specific route(s) of interest, travel times, and the delivery device(s) of interest.
2. A Customer Help Desk which provides the ability for handling customer service problems.
3. Billing and payment pre-processing which provides the processing necessary to organize customer service usage data into billing information which will then be provided to, for example, a third party independent service provider (ISP) for billing and payment services 206. An ISP is preferably identified to perform the billing and payment functions of the MTIS service such as providing bills to the customers, collect fees for the service, and distribute revenues according to a mutually agreed upon business revenue sharing model.

The above-described systems are preferably developed in an open-systems environment such that the algorithms and geo-referencing scheme that will be described in greater detail below can operate and interact in a heterogeneous software and hardware environment. The algorithms and geo-referencing scheme currently preferred have been developed to run in an Intel based hardware platform, Windows NT operating system environment, utilizing an Oracle relational database, but can be ported to operate on any hardware platform (Intel, Sun, HP, etc.) on any operating system (NT, SUN OS, HPUS, AIX, etc.), and utilize any relational database system (Oracle, Sybase, etc.), thus operating in a heterogeneous environment.

Figure 3:
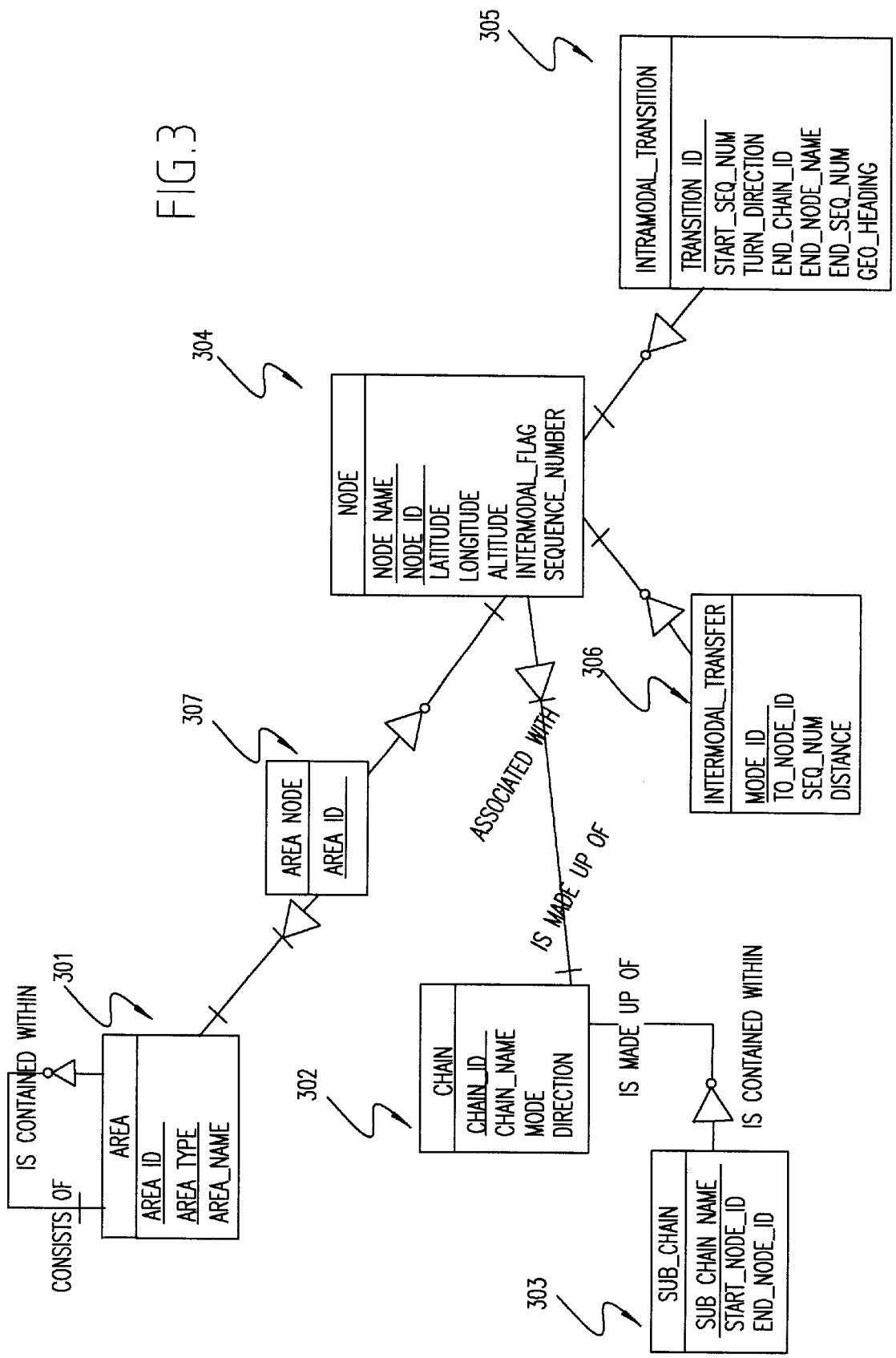
FIG. 3 is an entity relationship diagram representing a geo-referencing scheme in accordance with the invention.

Referring now to FIG. 3, it should be recognized that the common factor between the generalized travel conditions information and the customer's personalized routes is the location information. Utilization of a common geo-referencing scheme by the travel conditions information service provider and MTIS will significantly improve the timeliness and the accuracy of the information provided to the end user(s) by thus reducing the amount of data which must be subjected to fusing and packaging operations in the MTIS system 100 but uniformity or commonality of the geo-referencing scheme is not otherwise important to the basic principles and practice of the invention.

A node/chain geo-referencing scheme as illustrated in FIG. 3 in the form of a Booch diagram of node and chain objects is preferred for providing the location framework of the multi-modal network in MTIS. In FIG. 3, the triangle symbol between the Node and Chain objects signify the dependency relationship between the two objects (e.g. node existence is dependent upon an existence of a chain). Cardinality is represented by the hash mark, crow's feet, and zero symbols (e.g. the combination of zeros and crow's feet represents zero or more Cardinality).

The key objects of the node/chain geo-referencing scheme depicted in FIG. 3 are: area 301, chain 302, sub-chain 303, node 304, intra-modal transition 305 and inter-modal transfer 306. While not essential to the practice of the invention, provision of an area node object 307 facilitates relating of areas to nodes for automatic packaging of received information as described above. Attributes of these objects listed in FIG. 3 are self-explanatory to those skilled in the art in view of the following description of the objects and their relationships and are, moreover, somewhat arbitrary in regard to the basic principles and practice of the invention. Therefore, the attributes listed should be regarded as preferred but not exclusive or limiting.

An area object 301 represents a homogeneous geographic entity such as a town, city, county, borough, state, region, or school district, as identified by an area node 307 object, in regard to which information from information infrastructure 20 is likely to be articulated or expressed. Within an area there may be a multitude of transportation mode networks (e.g. roadways, rail lines, subway lines, bus routes, ferry lines, etc.). These various mode networks are represented as chains 302. Chains 302 define one direction of travel for a transportation mode, such as roadway, rail line, subway line, bus route, ferry line, etc. A chain may be composed of one or more sub-chains 303. Sub-chains 303 are utilized in cases where a roadway crosses a jurisdictional boundary (e.g. city, county or state line) and thus acquires an alias, or a published direction change for a roadway.

A node 304 represents decision points throughout the geo-referencing scheme (e.g. roadway intersection, bus stop or terminal, subway station, train station, ferry dock, and the like) or marks the start point and/or end point of a chain or sub-chain. A node that joins two or more chains or sub-chains is shared by those chains or sub-chains.

Connections at a single node 304 between two chains of the same travel mode, are defined as an intramodal transition 305 (e.g. turn lane at an intersection, exit ramp at an interchange, a train station, a bus terminal, subway station, and the like). Legal (e.g. recognized as possible) connections between two or more nodes of different transportation modes is defined as an intermodal transfer 306 (e.g. park-and-ride lot, train station, bus terminal, subway station, airport, and the like). Transitions 305 and transfers 306 thus provide for all options which may be presented to a traveller along any arbitrary route by any modes of travel which may be available and with which travel conditions information may be associated.

Sequence numbers are attached to each node along a chain to imply order and direction. It is the sequence number and the chain_id that assists the MTIS system in determining specific locations of the travel condition event and the customer's personalized route segments. For enhanced granularity (e.g. specificity and detail), sequence numbers can preferably be taken a level lower. This allows for specific definition of transition end points, or other points of interest.

Figure 4:
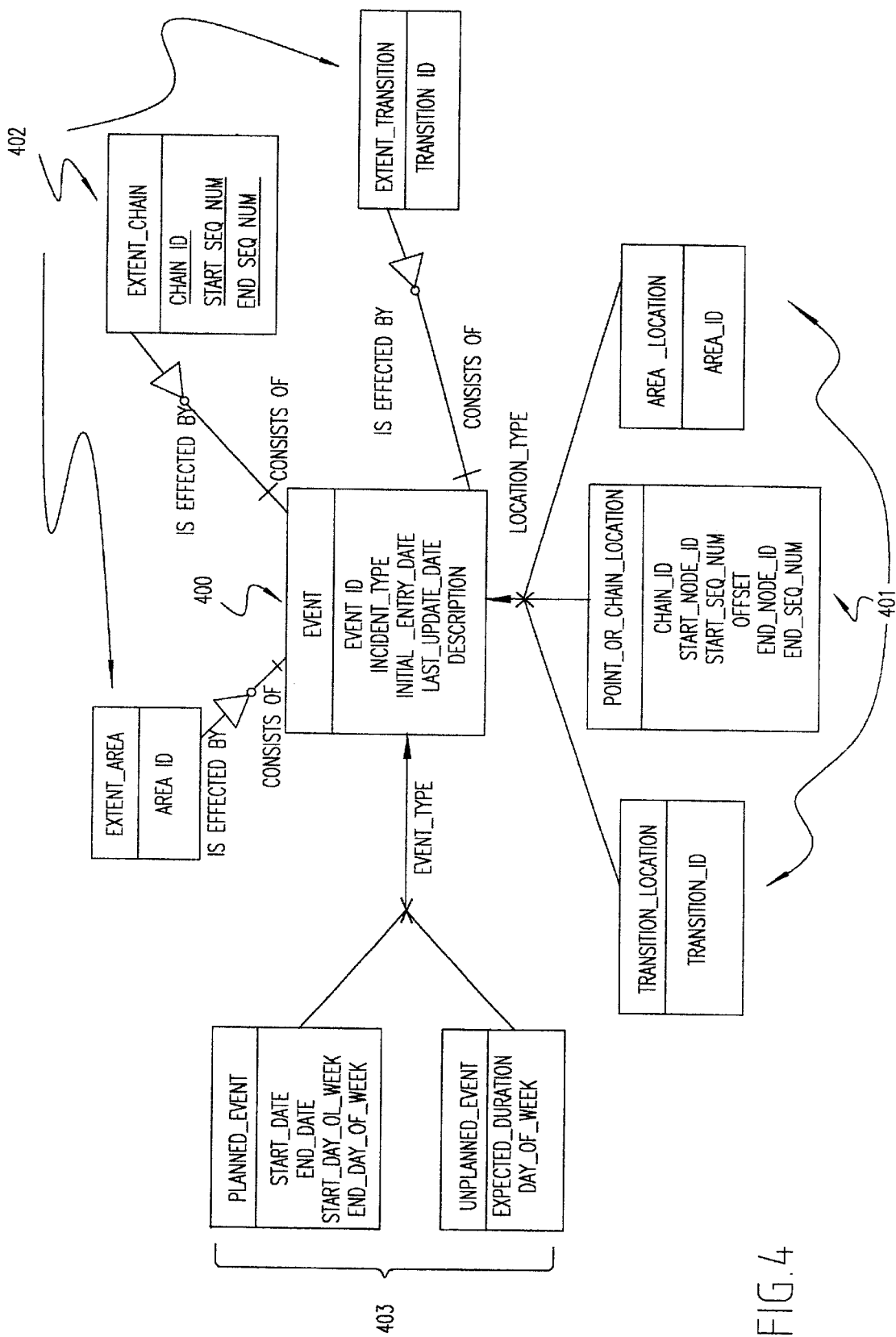
FIG. 4 is an entity relationship diagram representing the travel condition event scheme employed in the preferred embodiment of the invention.

Referring now to FIG. 4, travel condition events 400 that are geo-referenced utilizing the node/chain scheme depicted in FIG. 3 will have an attribute known as location type. The location type may take on one of four possible values: transition, chain, point or area, collectively indicated at 401. Depending on which of the four possible values as to which the location type is defined, there are additional attributes attached to the travel condition information (e.g. if the location type is point or chain, then the attributes necessary to define that location are chain_id, start_node_id, start and end sequence number of the containing chain, offset from the start node of the containing chain, and end_node_id). In this way, relationships to the object structure of FIG. 3 are defined.

Travel condition events often impact multiple elements of the object network structure illustrated in FIGS. 3 and 4 (e.g. an accident on a roadway may affect intersecting and surrounding roadways as well as bus routes that utilize these roadways). The extent(s) of these effects is identified as zero or more area(s), chain(s) and/or transition(s) 402, as reflected in chain 302 and accessible from the corresponding object classes (301, 302, 305, respectively) of FIG. 3. When multiple transportation modes are not required, more conventional link node referencing schemes (e.g. at 304 of FIG. 3) can be used to bind customer routes, as will next be described with reference to FIG. 5, and travel condition events.

Figure 5:
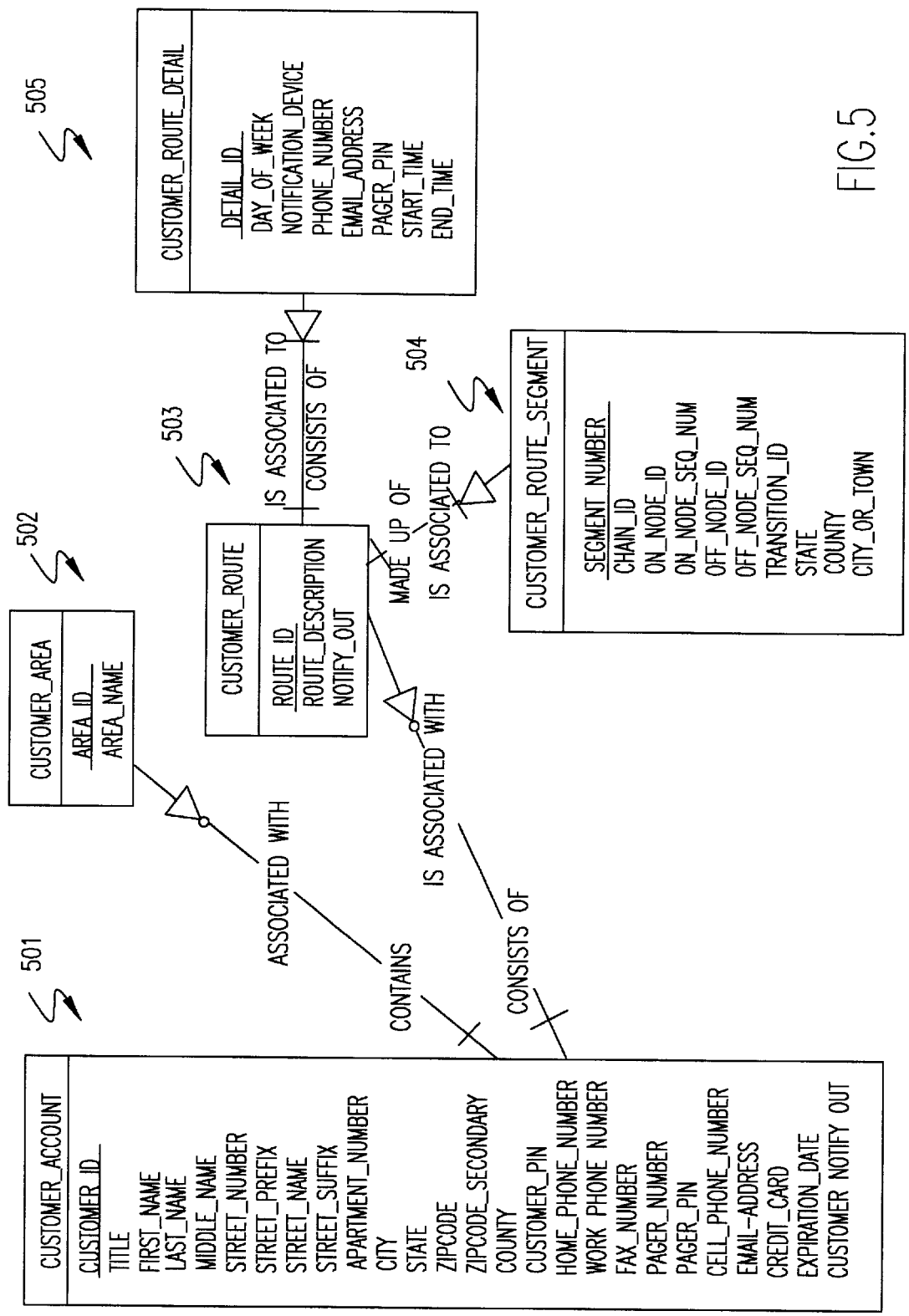
FIG. 5 is an entity relationship diagram representing the customer data profile in accordance with the preferred embodiment of the invention.

The function of registering a new customer which develops the data object structure depicted in FIG. 5 provides the means for entering the customer's account information, their personal travel route(s) and preferred notification criteria. The data provided by the customer will be stored in their own customer account in the relational database management system (RDBMS) for MTIS 100. FIG. 5 represents the structure of the data that is stored in the relational database included by the customer service center 202 of FIG. 2.

The function of registering a new customer is preferably partitioned into three sub-functions. The sub-function, Create A New Customer Account, provides for the entry of a customer's account information, such as name, address, contact phone numbers, and payment method information in an instance of customer account object class 501. It is here that the customer is given their own personal customer identification number which assists MTIS in uniquely identifying each registered customer.

Upon successfully capturing the customer's account information 501, exemplary values for which are illustrated in FIG. 5, the customer's personal travel route(s) 503 are registered. In the sub-function, Create Customer Areas, the customer is allowed the opportunity to provide the names of specific areas 502 for which they want travel conditions information filtered for, such as state, city, county, and/or school district, as discussed above in connection with FIG. 3. This information is useful in providing area specific travel conditions, such as current weather conditions and school cancellations.

The sub-function Create Customer Routes provides for the entry of specific routes 503 for which the customer wants travel conditions information filtered, such as their route from home to work or work to home. Each route can be based on either a single mode of travel (e.g. train only) or multiple modes of travel (e.g. roadway, train, bus and ferry). (The mode of travel is implicit in the route and a separate attribute is not necessary.) Instead of having to chose from a pre-determined routing list, the customer is preferably free to describe the paths of their route by the common names of the multi-modal network (e.g. Henry Hudson Pkwy, Hunterspoint Ferry, M34 Bus, and the like) which can readily be converted to areas, nodes, modes and the like by suitable comparison processing which will be evident to those skilled in the art. Specifically, MTIS 100 translates the given common name into the appropriate objects (e.g. chain_id, on_node, off_node, and start and end sequence numbers of the chain) of the node/chain geo-referencing scheme as illustrated in FIGS. 3 and 4.

Figure 6B:
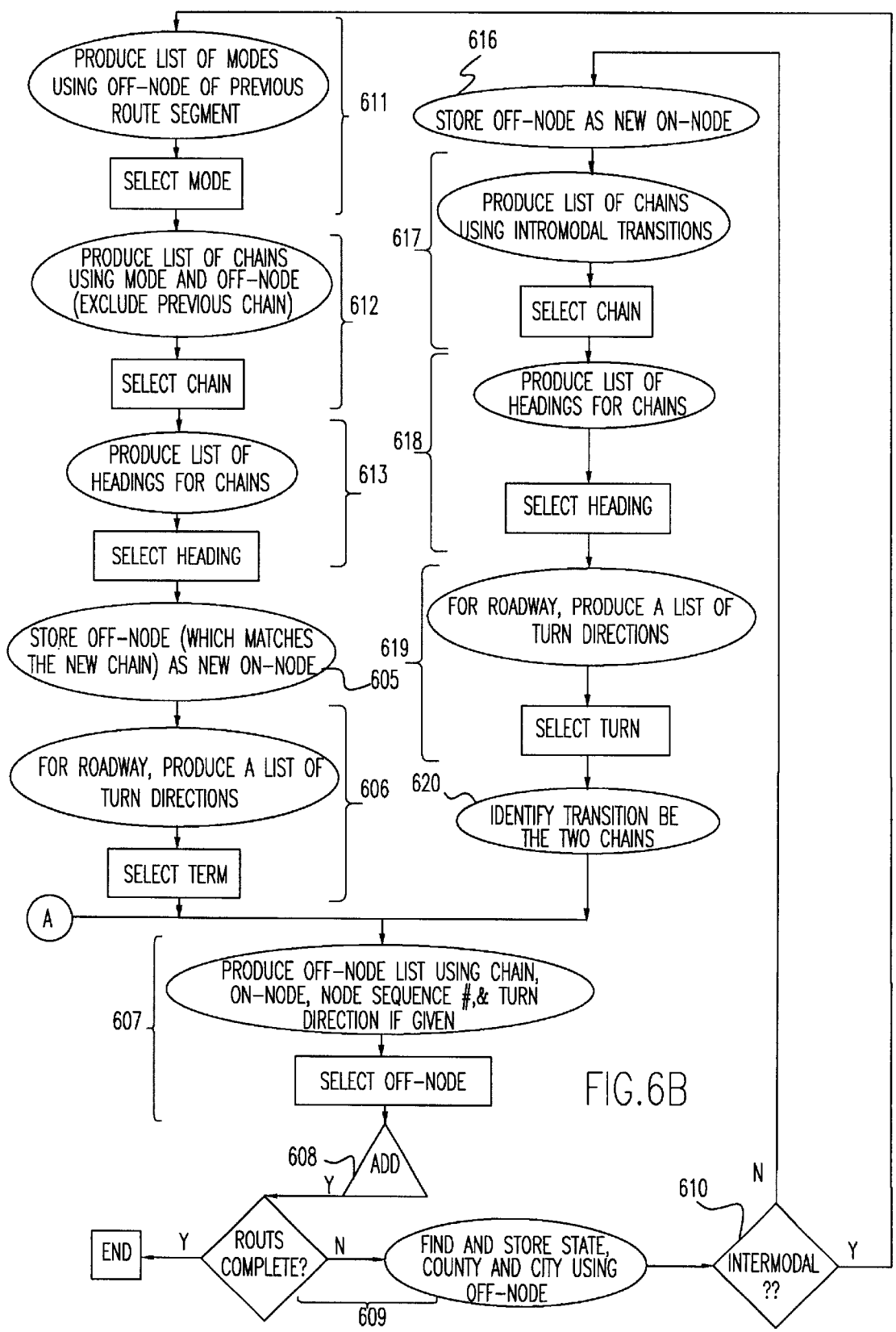
FIG. 6 is a flow chart for creating customer routes in accordance with the invention.

The initial step to capturing a customer's route, as shown in FIG. 6, is the verification or selection of the starting area 601. Based on the designated area, a listing (e.g. a menu) of available modes of transportation is provided, and the customer's preferred mode is selected at 602. Limitation of possible selections in this way eliminates specification of travel modes which are impossible or do not exist at a node. Next, a list of chains for the selected area and mode of transportation is produced, and the customer's preferred chain is selected at 603. All valid geo-headings (e.g. North, South, East, and West) are provided at 604 for the selected chain 603. Once the chain 603 and heading 604 are determined, all valid on-nodes (e.g. a node at which travel from that node may be commenced via an available travel mode) are listed at 605. The customer then selects their on-node in any convenient fashion (e.g. from a menu). In the case of roadways, the customer is required to provide a turn direction 606. Based on the previous information provided, a set of valid off-node choices is displayed, and the customer makes a selection 607 to complete a description of a segment of a route.

Prior to committing this segment to the route, the information provided is verified with the customer at 608. If the route has not been completely defined, then the area information of the next segment is determined at 609. The geo-referencing database is queried to determine the legal (e.g. available) transportation mode alternatives at this location. There are two options at this point. If there are additional modes available, the customer must indicate their desire to change modes or continue with their current mode at 610. If the customer decides to switch modes, then a new mode must be selected 611. A list of available chains for the selected mode and current node is supplied, and the customer's preferred chain is selected at 612. All valid geo-headings are provided for the selected chain at 613. The off-node from the previous segment is then stored as the on-node of the current segment at 614. In the case of roadways, the customer is required to provide a turn direction 615.

Based on the previous information provided, a set of valid off-node choices is displayed, and the customer makes a selection 607, as described above. Prior to committing this segment to the route, the information provided is verified with the customer at 608, as before. If the route has not been completely defined, then the area information of the next segment is determined at 609. Again, the geo-referencing database is queried to determine the legal transportation mode alternatives at this location and, again, there are two options at this point. If there are additional modes available, the customer must indicate their desire to change modes or continue with their current mode 610.

If the customer decides not to switch modes, the off-node from the previous segment is stored as the on-node of the current segment at 616. A list of available chains for the current mode and current node is supplied, and the customer's preferred chain is selected at 617. All valid geo-headings are provided for the selected chain 618. In the case of roadways, the customer is required to provide a turn direction 619. Next, the transition between the chain the customer is coming from, and the chain the customer is going to, is identified at 620. Based on the previous information provided, a set of valid off-node choices is displayed, and the customer makes a selection 607. Prior to committing this segment to the route, the information provided is verified with the customer 608. When the route has been completely defined, as determined at 609, it is stored in the customer's profile.

As further depicted in FIG. 5, the customer determines the type of service to be provided, either user-on-demand request or automatic notification for each of the defined routes 503. Other route specific information that is collected is the notification device information and the notification time window defined in an object of the customer route detail class 505.

Figure 7B:
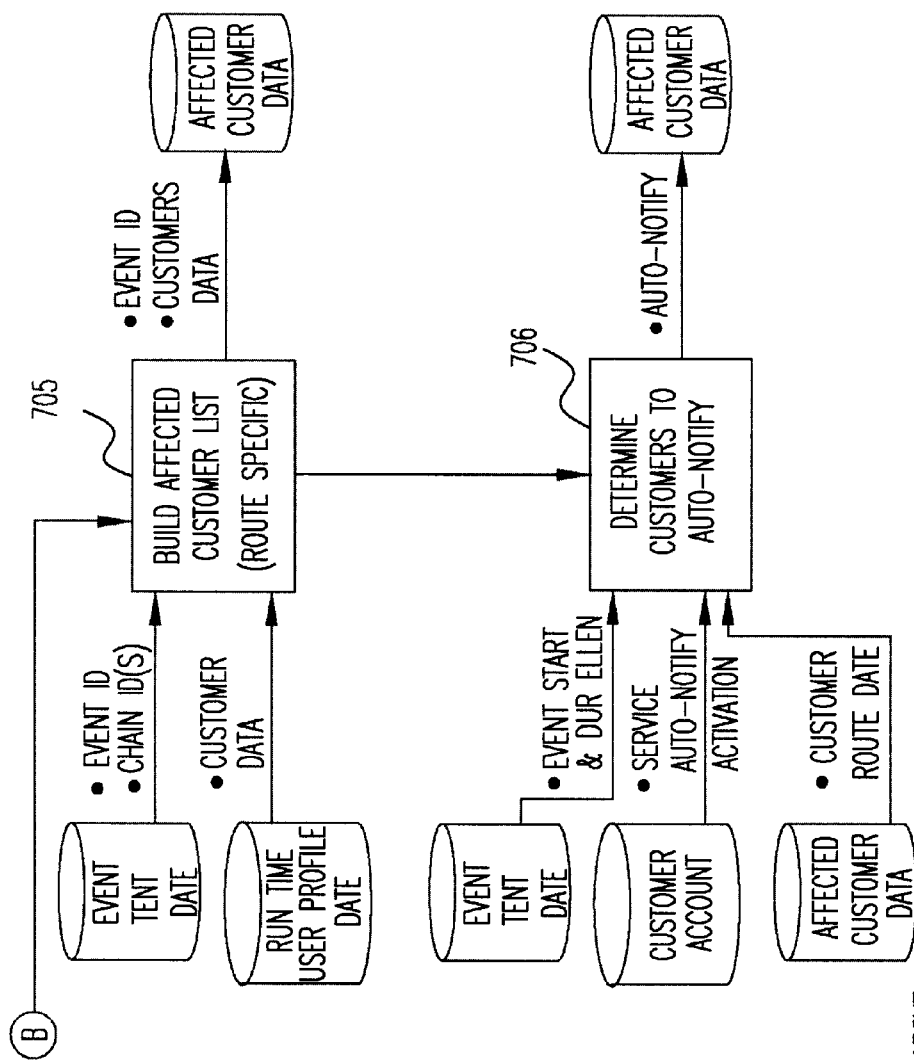
FIG. 7 is the overview flow chart for determining affected customers in accordance with the invention.

As illustrated in FIG. 7, MTIS 100 will receive information about travel conditions and filter that information according to the needs of the registered customers. It should be understood in regard to depiction of FIG. 7 that, in the interest of simplicity of illustration of connections, redundant indication is made of several classes of stored data including event text data and affected customer data (including updated affected customer data). As is well-understood in the art, management of this data is a familiar and well-understood database function and is not critical to the principles or practice of the invention. Additionally, articulation of the memory or memories in which the various categories of data depicted in FIG. 7 is unimportant to the practice of the invention and irrelevant to the principles thereof.

First, MTIS determines if a travel conditions report is for a new travel conditions event, an update to an existing event or a closure to a previously reported event at 701. If the event is closed, meaning the travel condition no longer exists, then the MTIS deletes customer data associated with that event from the affected customers database as illustrated at 703. When there is a new travel conditions event or update to an existing event, customers are identified as being affected by the reported travel conditions based on their specific areas, route segment sequence numbers which defines travel mode, and/or points of interest as indicated at 702 and a list of customers to be notified is built at 704. The determination is then made as to which customers will need to be automatically notified as indicated at 706. More specifically, the function of determining affected customers is preferably partitioned into three sub-functions: Build Affected Customer List (Route Specific) 705, Determine Customers to Auto-Notify 706, and Build Affected Customer List (Area Specific) 704.

Figure 8:
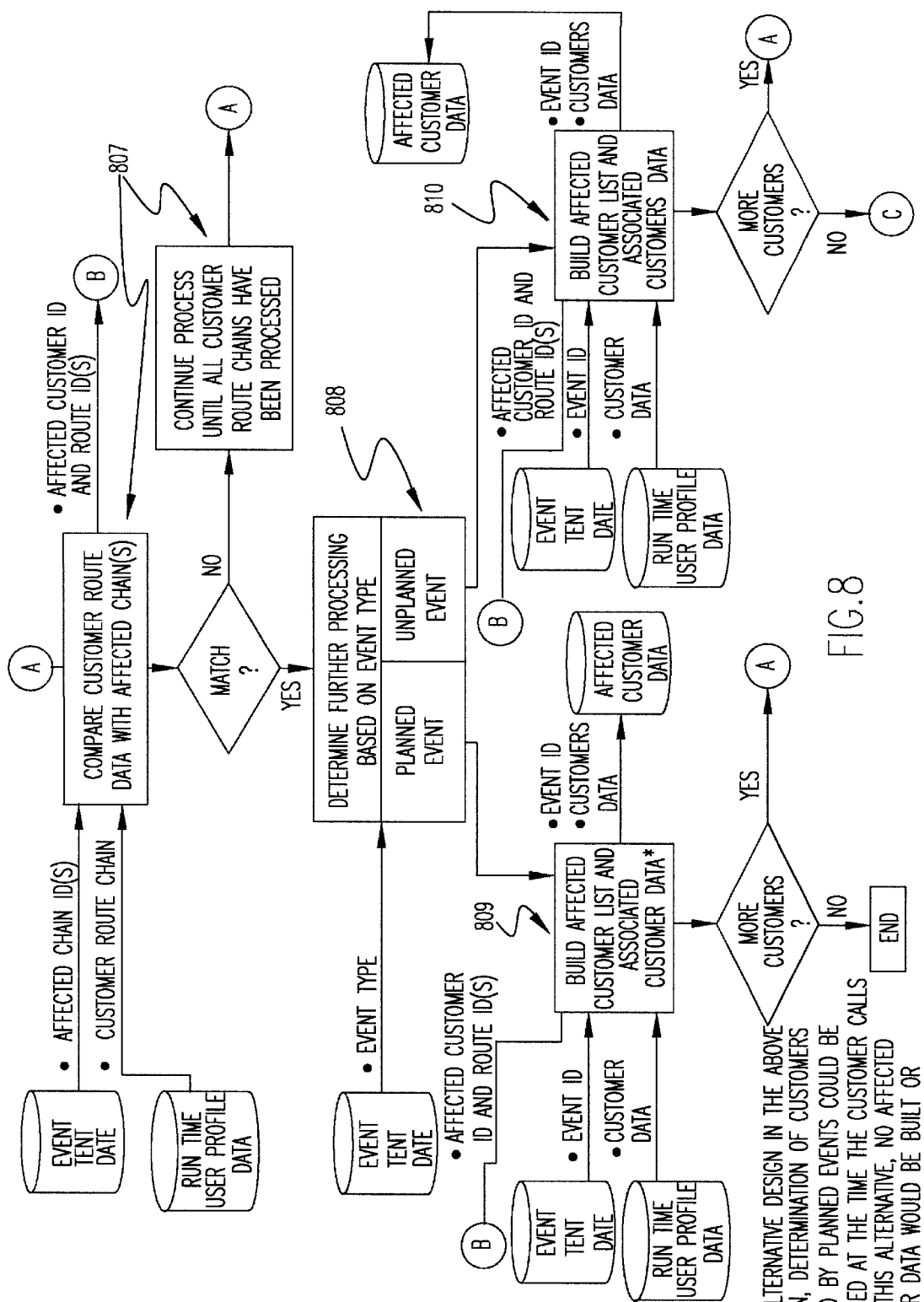
FIG. 8 is a flow chart for building affected customer lists for route specific travel conditions, FIG. 9A and 9B together form a flow chart for determining customers that need to be automatically notified in accordance with the invention.

The sub-function, Build Affected Customer List (Route Specific) 705, which is shown in greater detail in FIG. 8, determines at 807 which customers are affected by the reported travel conditions based on their personalized routes, as defined in their customer profile. The processing loops to A when no match is detected in order to sequentially process all routes. Successful comparisons provide identification of the affected customer and corresponding route for storage with information concerning the travel conditions event as an affected customer list is built at 809 or 810 as determined at 808 by the type of event (e.g. planned or unplanned) which has occurred.

It should be appreciated that the collective function of 809 and 810 is to determine customers which are affected by any event, whether planned or unplanned, in order to enable notification which may be ultimately carried out on either a call-in or automatic notification basis or both. For a number of reasons, including economy, advance knowledge and notification of planned events and the likelihood of a customer obtaining knowledge of planned events independently of the system of the invention and other expedients discussed below, it is preferred to avoid automatic notification of planned events and only include such information with information about unplanned events that invoke automatic notification. Thus, as a matter of processing economy and system performance, it is preferred to separate planned and unplanned events prior to building respective affected customer lists for planned and unplanned events. As a design alternative within the scope of the invention, it may be preferable to determine if a customer is affected by a planned event at the time a customer calls in in order to limit storage of large customer lists. Otherwise, processing for determination of customers affected by a planned event can be carried out at any convenient time.

Accordingly, further processing of affected customer data occurs is preferably, but not necessarily, based on the (planned or unplanned) type of travel conditions event determined at 808 as will be discussed in connection with FIGS. 9A and 9B for determining which customers to automatically notify. In either case, if there are further customers which may be affected by the event, the process then loops to A until all customers have been processed to determine if, in fact, their route(s) would be affected.

Figure 9A:
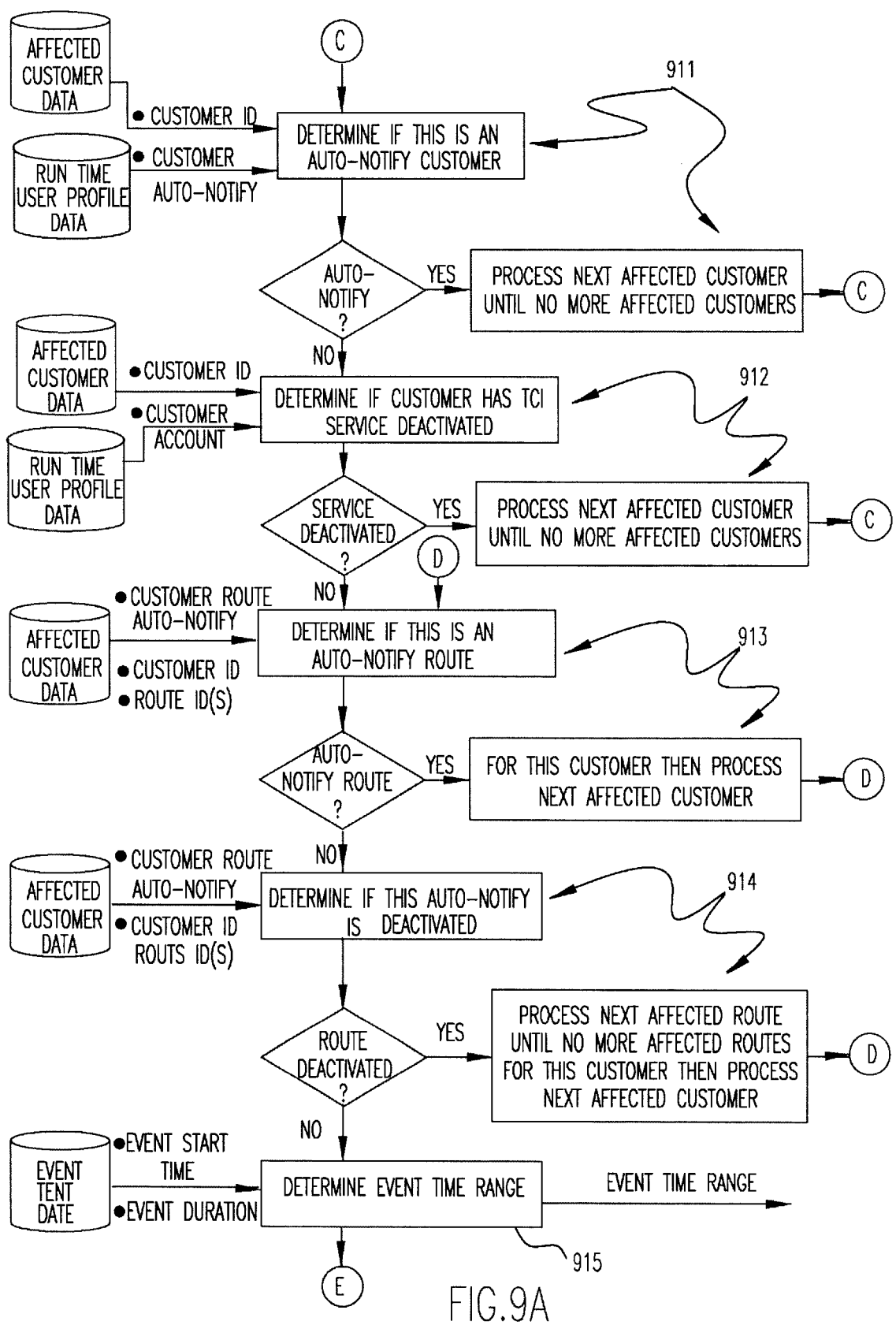
Figure 9B:
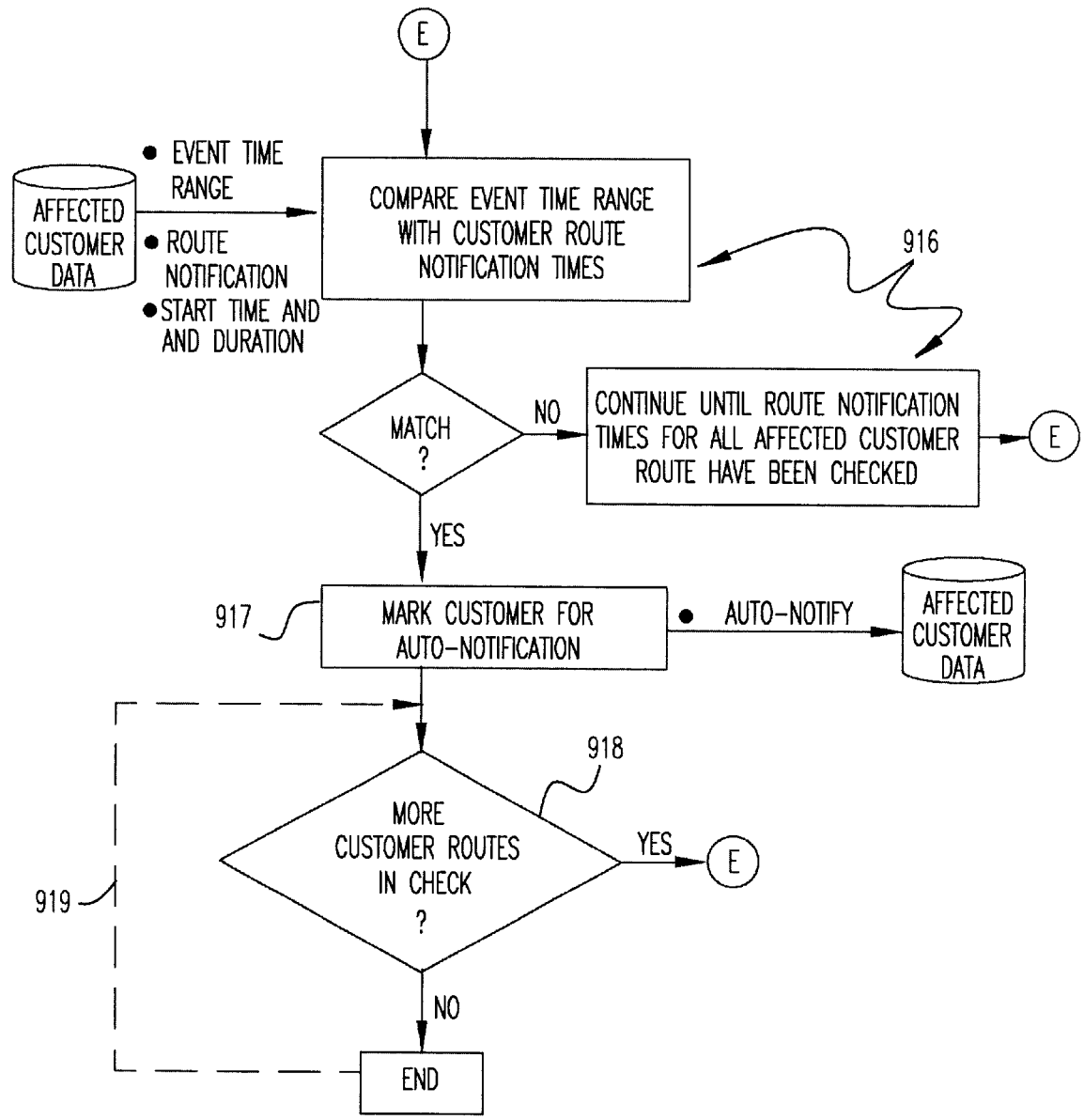

When all affected customers have been determined, the automatic notification filter as illustrated in detail in FIGS. 9A and 9B is preferably performed only for those travel condition events that are unplanned in nature (e.g. accidents, fires, etc.) as indicated by the branch to C from process 810 in FIG. 8. Determining customers for Automatic Notification, as illustrated in FIGS. 9A and 9B is principally based on the notification criteria in the customer's profile at 911 and the expected duration of the travel condition relative to the customer-specified route notification times at 915, 916 and only these processing steps are essential to the filtering for automatic notification.

The customer is preferably provided the option to deactivate their MTIS service for a specified period of time (e.g. out of town on vacation) and/or the option to deactivate the automatic notification service on a particular route. MTIS verifies that the customer's profile is currently active at 912 and their pre-stored route(s) are also active, as determined at 913, 914 prior to performing the automatic notification filtering process 916. Information about the customers that require automatic notification are noted as such in the affected customer list which is built and stored at 917. It should be appreciated that the testing for active customers and routes minimizes the data which must be processed for each unplanned event, looping through E. The separation of loops through A, C and E (and F of FIG. 10, as will be described below) also allows concurrency or pipelining of processing of the respective loops to improve system response time.

Figure 10:
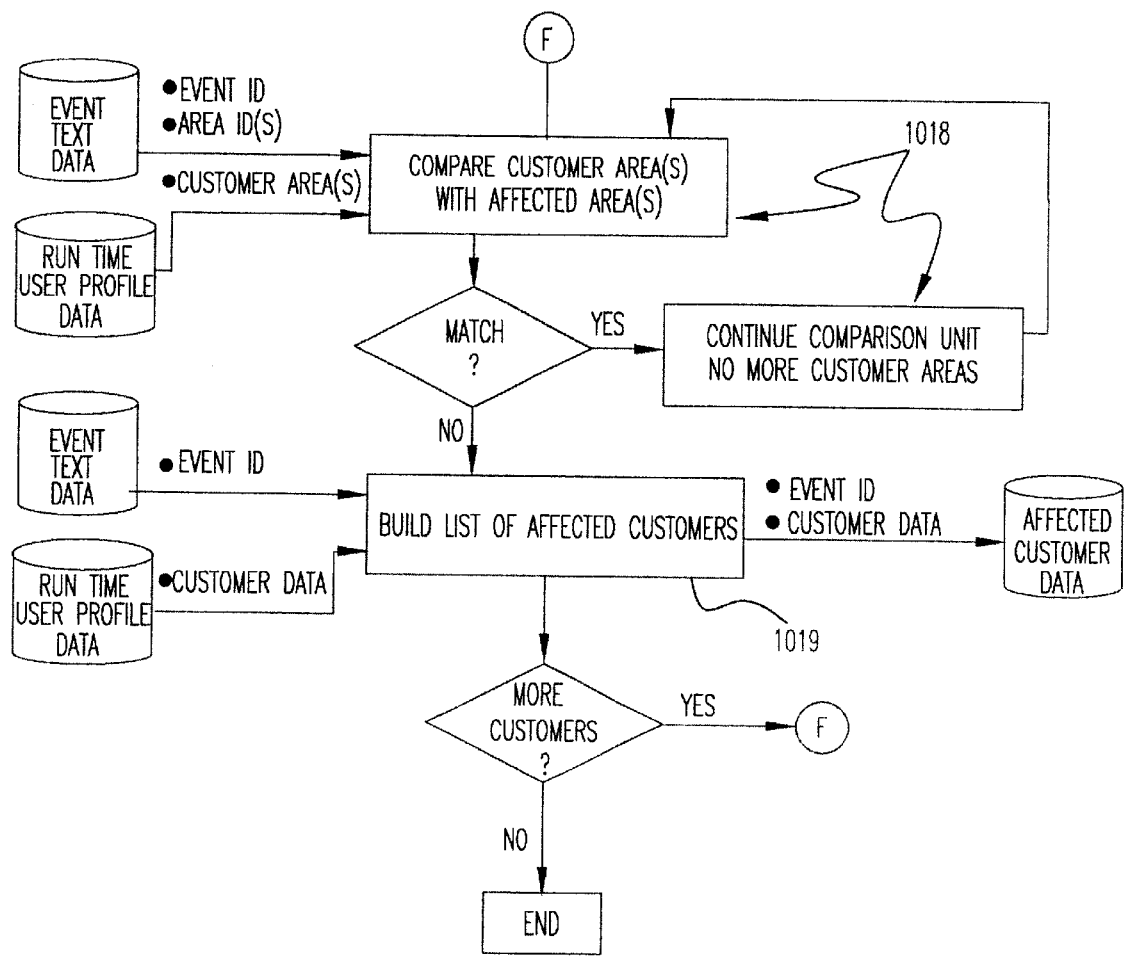
FIG. 10 is a flow chart for building affected customer lists for area specific travel conditions in accordance with the invention.

The sub-function, Build Affected Customer List (Area Specific) 704, determines which customers are affected by the reported travel conditions based on the areas defined in their customer profile FIG. 10, as illustrated at 1018. It stores information about which customers are affected by each reported area travel condition and updates the affected customer list at 1019 when information about an area travel condition is updated. In this regard, it should be noted that information regarding planned events is made available to automatically notified customers upon occurrence of an unplanned event since they will have already been placed on a list of affected customers when advance information concerning a planned event is received by MTIS 100. The information is also made available to automatically notified customers on a call-in basis in advance of the event. In this regard, it is preferred in the interest of both desired functionality and economy to allow access to personalized travel information on a call-in basis for all customers including automatic notification customers as an additional call-in function beyond the functions affecting customer account and profile changes, as will be discussed below in connection with FIG. 12. Therefore, it is preferred to build the affected customer lists 809, 810 at least for unplanned events in response to the occurrence or knowledge of the event, even though determination of a customer affected by a planned event may not be performed until call-in. Automatic notification can also be readily provided by treating a planned event as "unplanned" at 808 of FIG. 8 as of the scheduled time of occurrence. If the event does not occur as planned, of course, the event may be closed (subject to reactivation as an unplanned event at 701, 703 of FIG. 7).

The delivery of personalized travel conditions information to customers via their chosen delivery method (e.g. telephone (wired & wireless), pager (one-way & two-way), e-mail, facsimile, Internet, Intranet, in-vehicle device, etc.) is performed in the function Request/Disseminate Personalized Travel Conditions Information which may be performed at either PTCI system 203 or communication medium interface 205 (FIG. 2), as may be considered to be convenient. The appropriate travel conditions message is built for each customer based on their affected route(s) and their preferred communication device as specified in their profile, as described above.

For automatic notification customers, a determination is made when to notify each customer, based on their specified notification time and the current date and time. This function also handles the delivery of the travel conditions message(s) to each affected customer over their specified device. In the preferred embodiment of the invention, the Request/Disseminate Personalized Travel Conditions Information function has been partitioned into six sub-functions: Disseminate Personalized Travel Conditions Information via Phone (User on demand request), Manage Auto-Notification, Disseminate Personalized Travel Conditions Information via Phone (Automatic Notification), Disseminate Personalized Travel Conditions Information via Phone (Automatic Notification), Disseminate Personalized Travel Conditions Information via Pager (Automatic Notification), Disseminate Personalized Travel Conditions Information via Facsimile (Automatic Notification), Disseminate Personalized Travel Conditions Information via e-mail (Automatic Notification).

Preferred procedures for carrying out these sub-functions are illustrated in FIGS. 13–18. An overview of a preferred procedure for interfacing with a customer communicating by telephone with the system is illustrated in the flow diagram of FIG. 12. It will be noted in these Figures that processes indicated are principally for the purpose of obtaining information used in making a subsequent decision for branching in the processing. In FIGS. 12, 13A–13D and 15, information is preferably obtained by the playing back of recorded inquiry messages, depicted by an arrow to a block labelled "customer", and collecting responses to be correlated with customer data through speech recognition, the details of which are not important to the principles or practice of the invention. Even rudimentary known speech recognition techniques are sufficient to discriminate between possible alternative responses. As these responses are collected or previously captured or developed (e.g. affected customer lists, decisions can be made which cause the respective processes to branch, as desired, to carry out needed functions expeditiously. By the same token, while separate storage of such messages and customer data is depicted in these Figures (and numerous similarly labelled stores illustrated) for clarity, the articulation of memory for such storage is not important to the principles of the invention. It will be found convenient, however, to functionally group such messages and customer data into files or the like to speed access thereto and thus improve system performance.

Figure 12A:
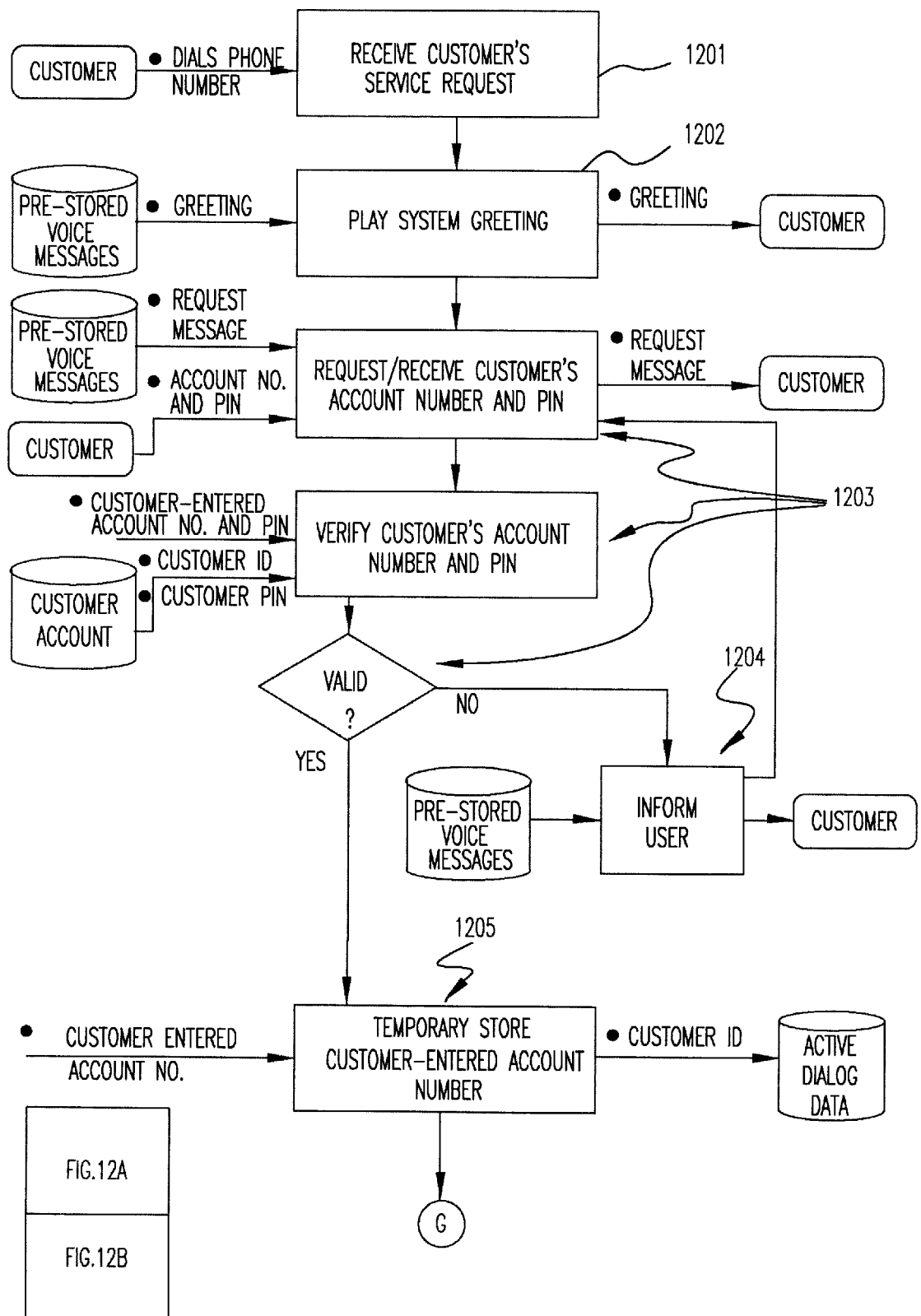
FIG. 12 is a flow chart illustrating an overview of the preferred operation of the telephone user interface.
Figure 12B:
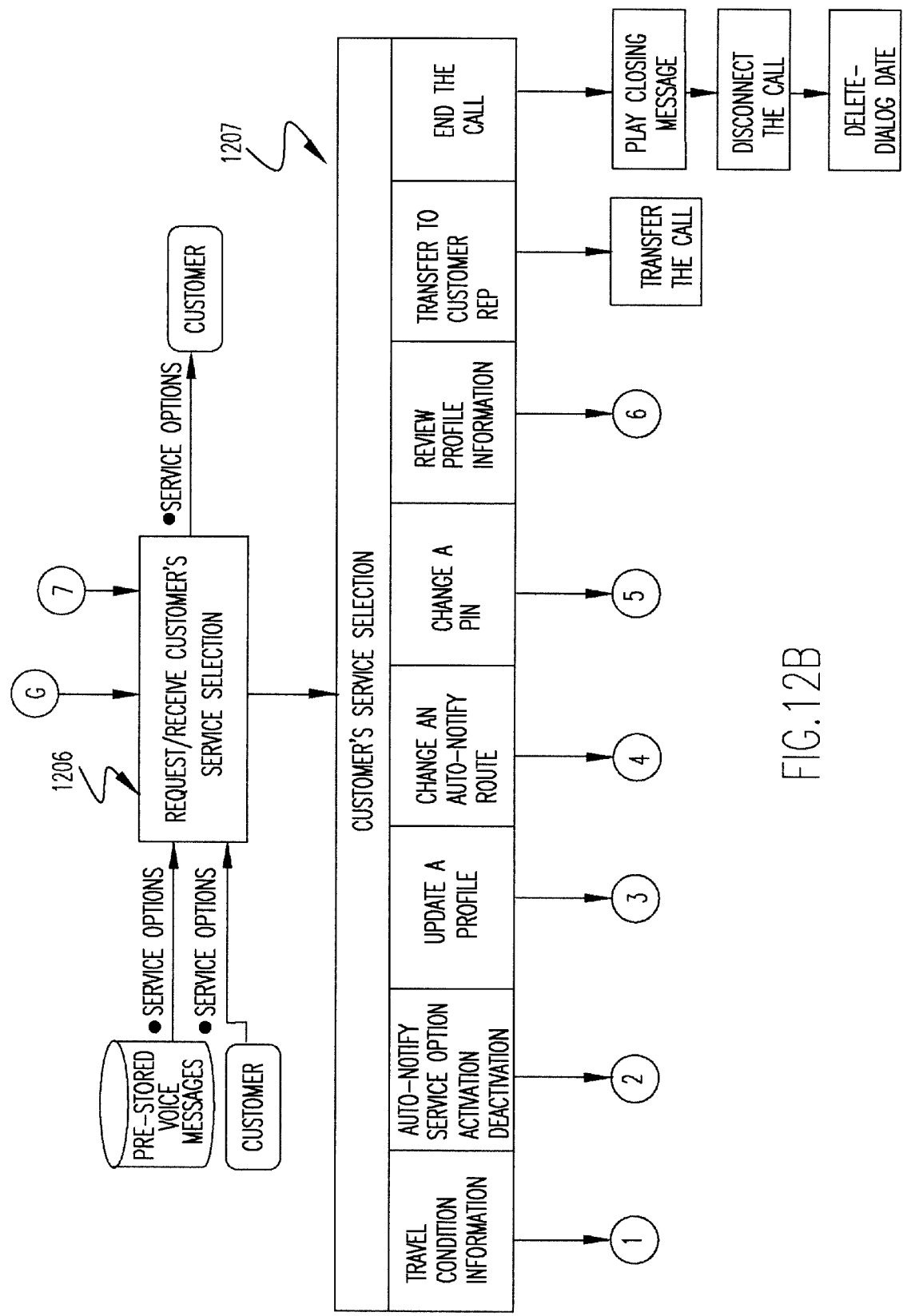

While the preferred sequence of operations depicted in the overview flow chart FIG. 12 for sections 60, 205 and 206 of FIGS. 2 and 11 is not critical to the practice of the invention, the procedure of FIG. 12 will be instructive to the development of other procedures as may be desired. For example, when a call is made to contact the system, the call is received at 1201 and an introductory greeting is played in response, as depicted at 1202. Then, as depicted collectively at 1203, the customer's personal identification number (PIN) is requested by playback of a message in a similar fashion and collected by speech recognition or telephone key actuation, verified against stored customer account information and a determination made as to the validity of the PIN.

If the PIN is not valid the caller is so informed at 1204 and the customer is again prompted for a PIN number by looping to 1203. Of course the number of loops (and permitted attempts to supply a valid PIN number) may be limited, as desired. If a valid PIN number is provided, the corresponding customer account number or some alternative data identifying the customer is stored, as illustrated at 1205, for access to the customer's personal profile data in accordance with functions the customer may request in response to a prompt at 1206.

Storage, at this point, of some data identifying the customer also allows the system to maintain an active dialog with a number of customers in subsequent processes which will be described below which utilize two-way communication available with some communication media to which the system is able to interface. It will be appreciated by those skilled in the art that these processes constitute a pipeline of substantial length and duration, particularly in consideration of possible slow response time of a customer to prompts. Therefore, by maintaining a list of customers engaged in active dialog with the system, a processor of the system (which preferably includes a plurality of processors operating in parallel) can switch to servicing a response/command from another customer immediately upon completion of any step of the process for any customer. Suitable techniques for management of processing requests from a plurality of customers by any single processor, whether or not in a multi-processor environment, are known in the art and the details of any such technique are not critical to the practice of the invention.

The functions selectable at 1206 include a number of functions to alter or update the customer's personal data profile (which should correspond to the number of types of items provided therein) as well as to transfer the call to a customer representative for special inquiries and services and to end the call. As will be discussed below, travel information can preferably be obtained on a call-in basis in the same manner that any other service related to the customer account can be selected and the caller is preferably prompted to select another service after any selected service has been completed.

The sub-function, Disseminate Personalized Travel Conditions Information via Telephone (Call-in—user on demand request), manages the dialog between the end user and MTIS and is illustrated in FIGS. 13A–13D. First, the system verifies the customer's account number and PIN as discussed above in connection with FIG. 12. Then it determines the proper messages to provide based on the type of conditions affecting the customer (e.g., area events, unplanned events, planned events) and the options the customer chose during the request. Specifically, the system receives the customer request at 1301 which may be simply a recognition that a request has been made as opposed to other functions available through the interface of FIG. 12 or determination, for example, which of a plurality of registered routes is the subject of the inquiry. (A route could be registered immediately prior to the inquiry by selecting the function of updating the customer profile.)

The system then determines if the customer is affected by current travel conditions based on active dialog data (e.g. a newly registered route) and current affected customer lists, as illustrated at 1302. At 1303, the process branches based on the determination of whether or not the customer is affected.

If the customer is not affected, a stored message is played to the customer as shown at 1304 and corresponding usage data is created and stored at 1305. The customer is then given the option of selecting a weather message (beginning at G of FIG. 13C). If the customer is affected, it is determined if the customer is affected by area events (1306, 1307). If so, and recalling that a customer could be affected by both area and route events, and area events message is played back to the customer. The customer is then preferably given the option of having the message repeated (1309), causing looping from 1310 to 1308. After such repetition, if and as desired and commanded by the customer, service usage data is developed at 1311 in the same manner as discussed above in regard to 1305. Accordingly, it is to be understood that development of usage information could be the same processing module, with or without variation depending, for example, on billing structures and rates, or separate and independent processes within the scope of the invention.

After usage data is developed for this function or if the customer is not affected by area events, the process branches to D (from 1311 or 1307, respectively) at the start of the preferred process depicted in detail in FIG. 13B. At 1312, it is determined if the customer is affected by route conditions. If not, a stored message is played back at 1313 and usage information is developed as described above in regard to 1305 and/or 1311 and the process continues to F of FIG. 13C.

If the customer is affected by route conditions, the customer is prompted to specify a previously registered route by a stored voice message which is preferably confirmed. Then, as further shown at 1314, a determination is made if the selected route is affected. It should be noted that this procedure allows a newly registered route to be processed against existing conditions as discussed above in regard to FIG. 9B since registration of a new route will cause that portion of the auto-notification list process to become incomplete even if previously completed for all previously registered routes. That is, after the process is completed for all currently registered routes, it enters a "wait" state depicted by dashed line 919. A new route registration then causes branching at 918 to E to process the new route and re-entry of the wait state.

If the selected route is not affected, a pre-recorded message is played back and customer usage data is created (1315), in the manner discussed above. The customer is then given the option (1312*a*) of selecting another route and, if selected, the process loops back to E and 1314. If another route is not selected the process continues at F of FIG. 13C for planned event information.

If any selected route is affected by current conditions, as determined at 1314, an event voice message is played back to the customer and can be repeated at will on customer command as described above. Then, as further depicted at 1316, customer usage data is created as previously described and the customer is allowed to select another route as described above. This function allows the customer to compare alternate routes which have been registered to find an unaffected route or to compare condition information between affected routes.

Figure 13D:
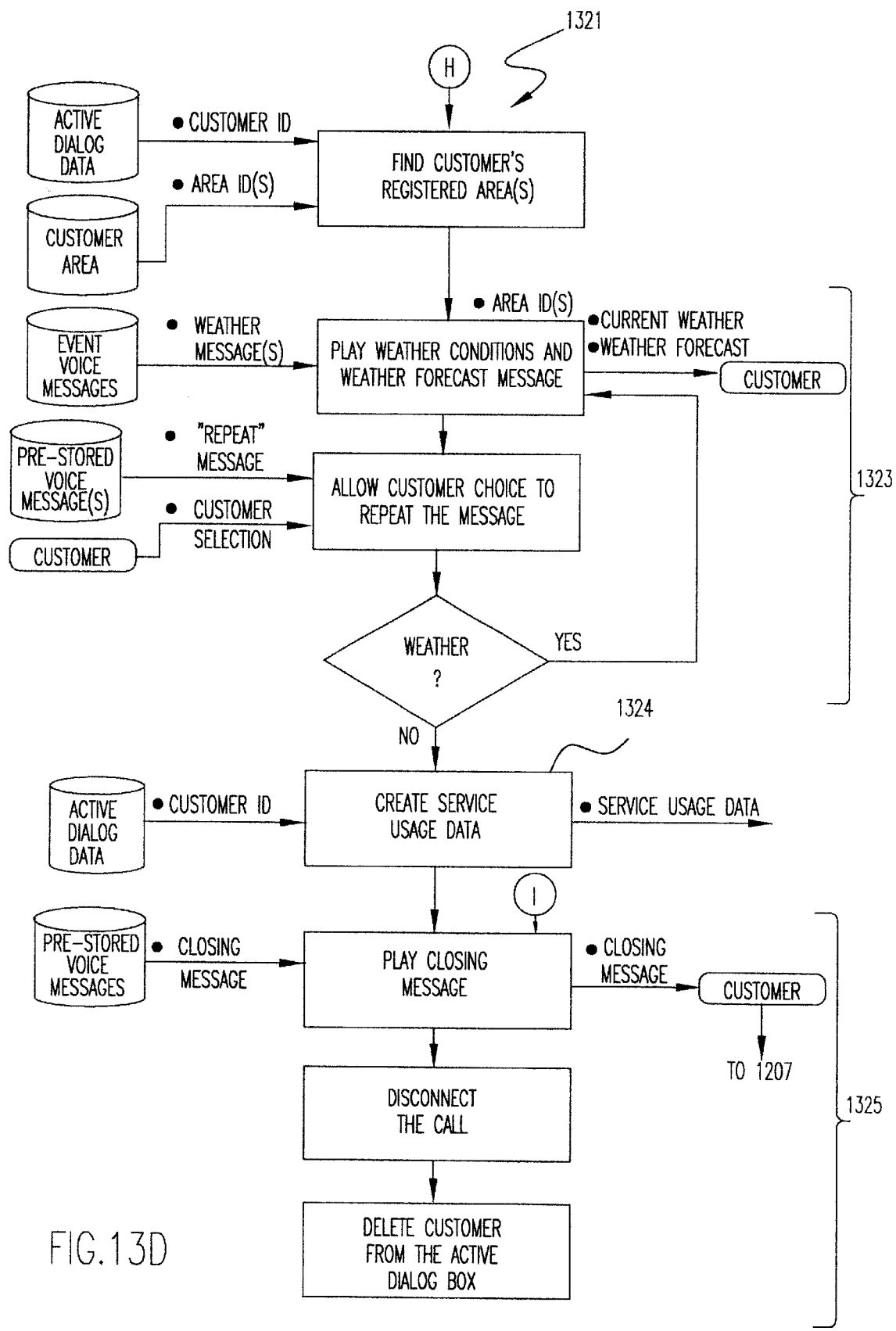

At the end of the process depicted in FIG. 13B (after the customer has indicated that no further routes are to be selected, causing branching and looping to E), the process continues at F of FIG. 13C. At 1317, the customer is prompted by playing back a stored message to indicate whether planned event information is desired. If planned event information is not desired, the process branches to G and the customer is prompted by playing back another stored message to indicate if weather information is desired, as indicated at 1321 and the process continues as will be discussed below in connection with FIG. 13D.

If planned event information is desired, it is determined from affected customer lists, built as discussed above with reference to FIG. 8, if the customer's registered routes are affected by any planned event. If the customer is not affected, a stored message is played back to so indicate and usage data is created at 1319. If the customer is identified as affected from the affected customer lists, a stored event message is played back, may be repeated on demand in a manner similar to that discussed above and corresponding usage data is created at 1320. The process continues by prompting the customer to indicate if weather information is desired at 1321, as discussed above, and the process branches to H or I of FIG. 13D in accordance with the customer's positive or negative response, respectively.

If the customer desires weather information, the process branches to H and the customer's registered area is found, as indicated at 1322. The weather message for the corresponding area is then played back and repeated on demand (or by default until the customer exits the message) in the manner discussed above, as indicated at 1323. Corresponding usage data is then created at 1324. This step completes delivery of all services available in the preferred embodiment of the invention although other services could be provided in a similar manner to those described above if additional data is made available to the system.

The process is completed by the playback of a closing message to the customer, the call is disconnected and the customer identifying data is deleted from the active dialog data stored as discussed above at 1205. Although it is not anticipated to be likely for most call-in services, the closing message could be arranged to allow branching to 1207 of FIG. 12 for further services, such as to provide for direct communication with an operator of the system. This may be useful to a customer to, for example, determine onset or other details of an event of interest or to make a report of a condition observed by the customer which was not satisfactorily reported by the system during the above-described call-in service process.

Figure 14:
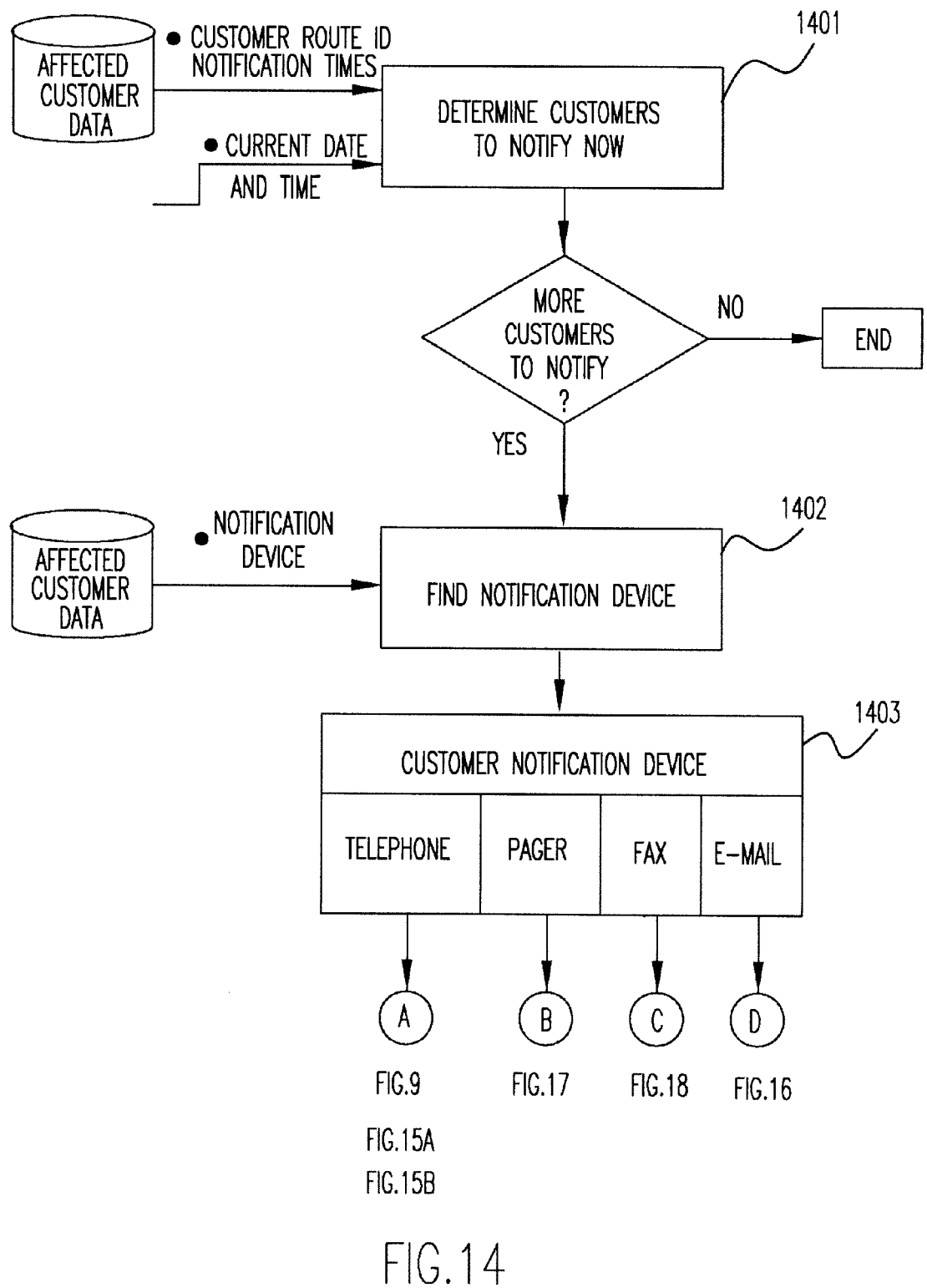
FIG. 14 is a flow chart illustrating a preferred operation in accordance with the invention for managing automatic subscriber notification.

Manage Auto-Notification, a preferred form of which is illustrated in detail in FIG. 14, preferably runs substantially continuously (e.g. can be interrupted, if at all, only by extremely heavy call-in processing loads or when the current time and a subsequent interval does not correspond to any customer notification request time). This processing determines which of the affected customers need to be notified at any given time, based on the customer's specified notification time window and the current date and time as illustrated at 1401. It also determines which notification device should be used, based on information contained in the customer's profile as illustrated at 1402. This information is retrieved and used to cause the process to branch at 1403 to one or more of the processes illustrated in FIGS. 15A–18.

It should be understood that it is preferred to provide at 1403 for invoking as many of the modes of information dissemination as the customer may specify during registration. Such service may be desired where a given customer, for example, wants a hard copy by facsimile or a record by e-mail of any report made by telephone or where the customer may be in different locations that have only different notification media available during the registered auto-notification window. This may also include simultaneous processing (or serial iteration) of a plurality of instances of any of the processes for communication illustrated in FIGS. 15A–18. Such service may be desired by a given customer, for example, who may be in any one of a number of locations providing the same notification media during the registered notification window.

Figure 15B:
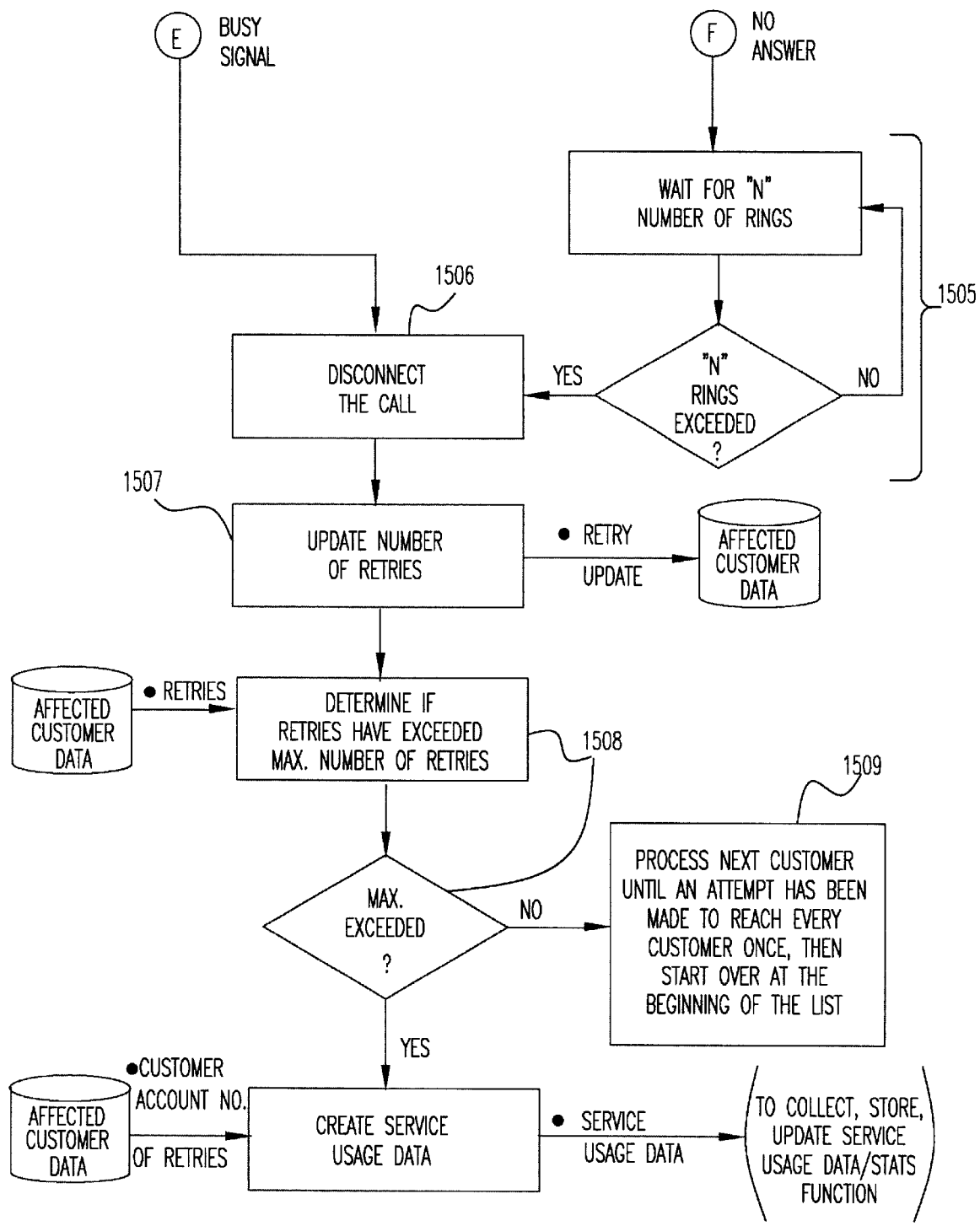

The sub-function, Disseminate Personalized Travel Conditions Information via Phone (Automatic Notification), a preferred form of which is illustrated in FIGS. 15A and 15B, manages the automatic delivery of personalized travel conditions information messages via telephone. It should be noted that an active dialog is preferably not provided for auto-notification but could be accomplished in the manner discussed above for call-in serve processing, if desired.

This sub-function, when invoked by the process of FIG. 14, described above, determines the correct phone number to use to contact each customer and manages the system according to the phone call response (e.g. answered by a person, answered by an answering machine, busy signal, or no answer) by branching at 1502. If the call is answered, it is determined if the answer was by a person or an answering machine, branching to 1503 or 1504, respectively. The procedures in these respective branches are identical except for providing repetition of the message which is available from an answering machine and thus need not be provided by the system. The route name of the affected route will generally be implicit in the event message and it is thus preferred in the interest of minimization of call duration to omit the route name from message repetition. A single playback of the route name, however, is considered to be desirable to orient the customer for receiving the event voice message.

Accordingly, in contrast to any or all of the loops such as from 1310 to 1308 of FIG. 13A, described above, repetition in branch 1503 should not be provided by default or the number of default repetitions should be limited in the event that an answering machine is not recognized and branch 1504 taken. In either branch when a successful connection is made, this function determines the proper messages to play to the customer based on the type of conditions affecting that customer and playback is sequentially provided of a system greeting, an affected route name message, an event message and a closing message, after which the call is disconnected, usage information is created and stored and the customer is marked as notified and thus removed from the list of affected customers processed in accordance with FIG. 14 as discussed above.

If the call is not answered, the portion of the sub-function illustrated in FIG. 15B will make a pre-defined number of attempts to deliver the message if a busy signal or no answer is received. That is, a predetermined but arbitrary number of rings is allowed at loop 1505 prior to disconnection at 1506. Disconnection is preferably done immediately if a busy signal is detected. When the call is disconnected without delivery of a message, the number of retries is updated and stored with affected customer data. As indicated at 1509, a retry will be made under control of the auto-notification management processing of FIG. 14 until an arbitrary maximum number of retries is determined to be exceeded at 1508. The order of customers for retry is not particularly important but it is preferred to try (and retry) auto-notification for each customer determined in FIG. 14 prior to (another) retry for a given auto-notification customer since it is believed that such an order maximizes timeliness of notification and likelihood of success in notification of a maximum number of customers while minimizing telephone system usage.

Figure 16:
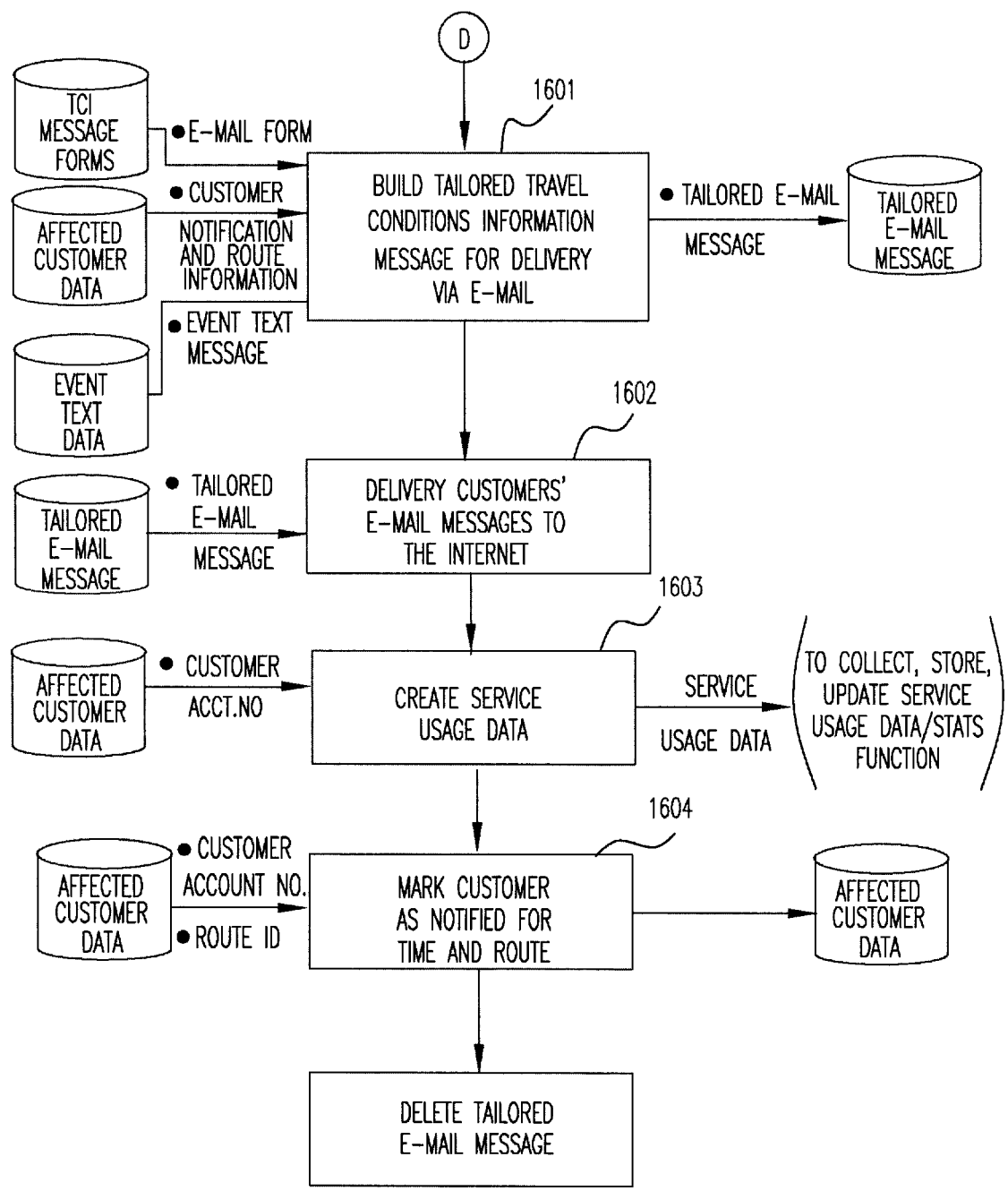
FIG. 16 is a flow chart illustrating a preferred operation in accordance with the invention for distribution of information by electronic mail (e-mail)

Referring now to FIG. 16, if branch D is invoked at 1403 of FIG. 14, an e-mail message is built from travel conditions messages, preferably received in a standardized form, input to the system at 207 of FIG. 2. Disseminate Personalized Travel Conditions Information via e-mail (Automatic Notification) manages the delivery of personalized travel conditions information messages via e-mail. It assembles the personalized travel conditions message according to a pre-defined format needed for an e-mail message. It determines the correct e-mail address and sends the e-mail message out over the Internet. The customer's registered e-mail address and the e-mail message are delivered to the internet at 1602. Provision for retry is not generally necessary since the internet service provider/server is arranged to be accessible and will carry out notification of the e-mail client and deliver the message on demand.

Disseminate Personalized Travel Conditions Information via Pager (Automatic Notification), illustrated in FIG. 17, manages the delivery of personalized travel conditions information messages via pager. It assembles the personalized travel conditions message according to a pre-defined format needed for each customer's pager. It determines the correct phone number to use to contact each customer's pager company. It manages the system according to the phone call response (e.g. answered, busy signal, or no answer) and delivers the pager message when a successful connection is made. The sub-function will make a pre-defined number of attempts to deliver the message if a busy signal or no answer is received.

Figures 18, 18A:
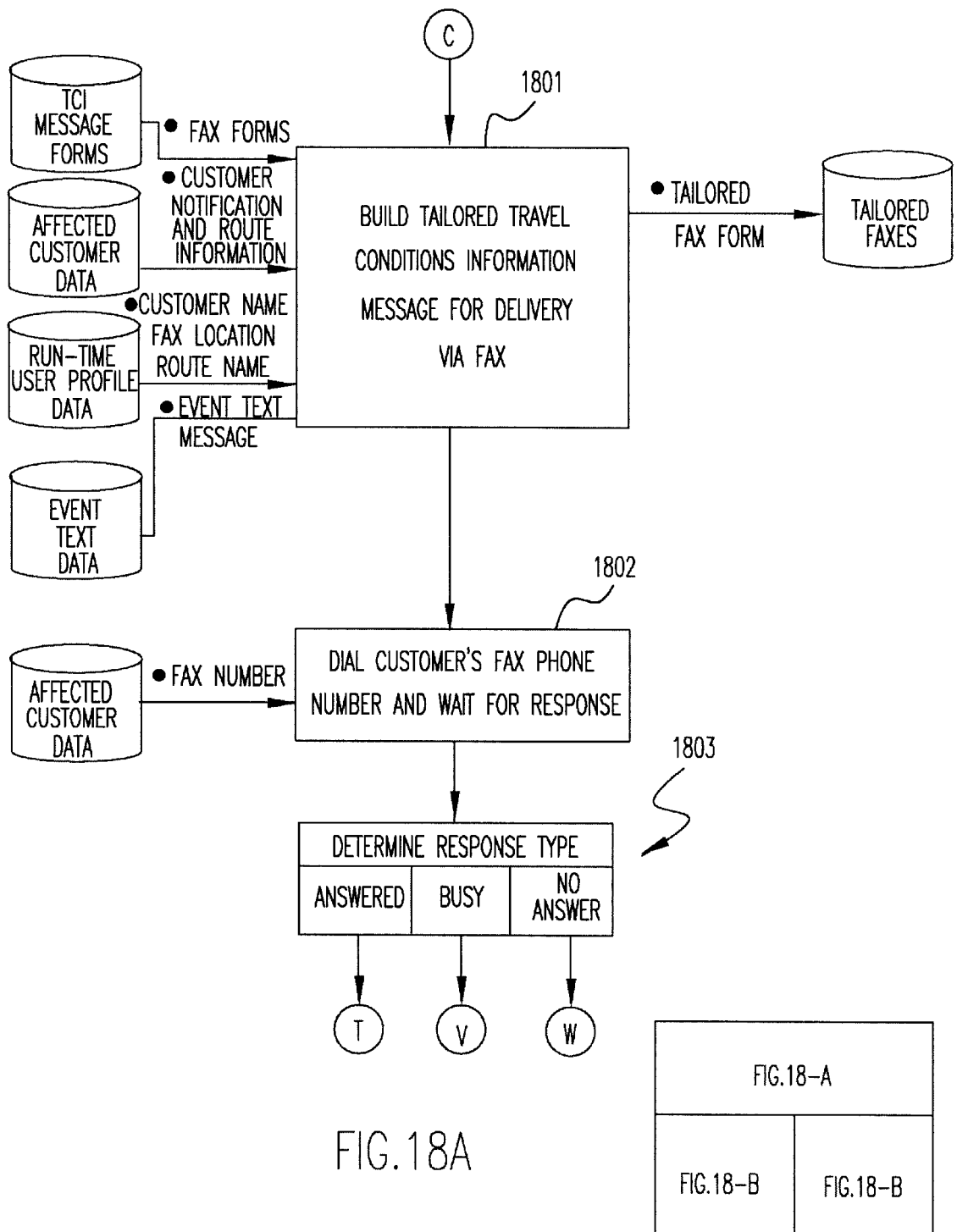
FIG. 18 is a flow chart illustrating a preferred operation in accordance with the invention for distribution of information by facsimile.
Figure 18B:
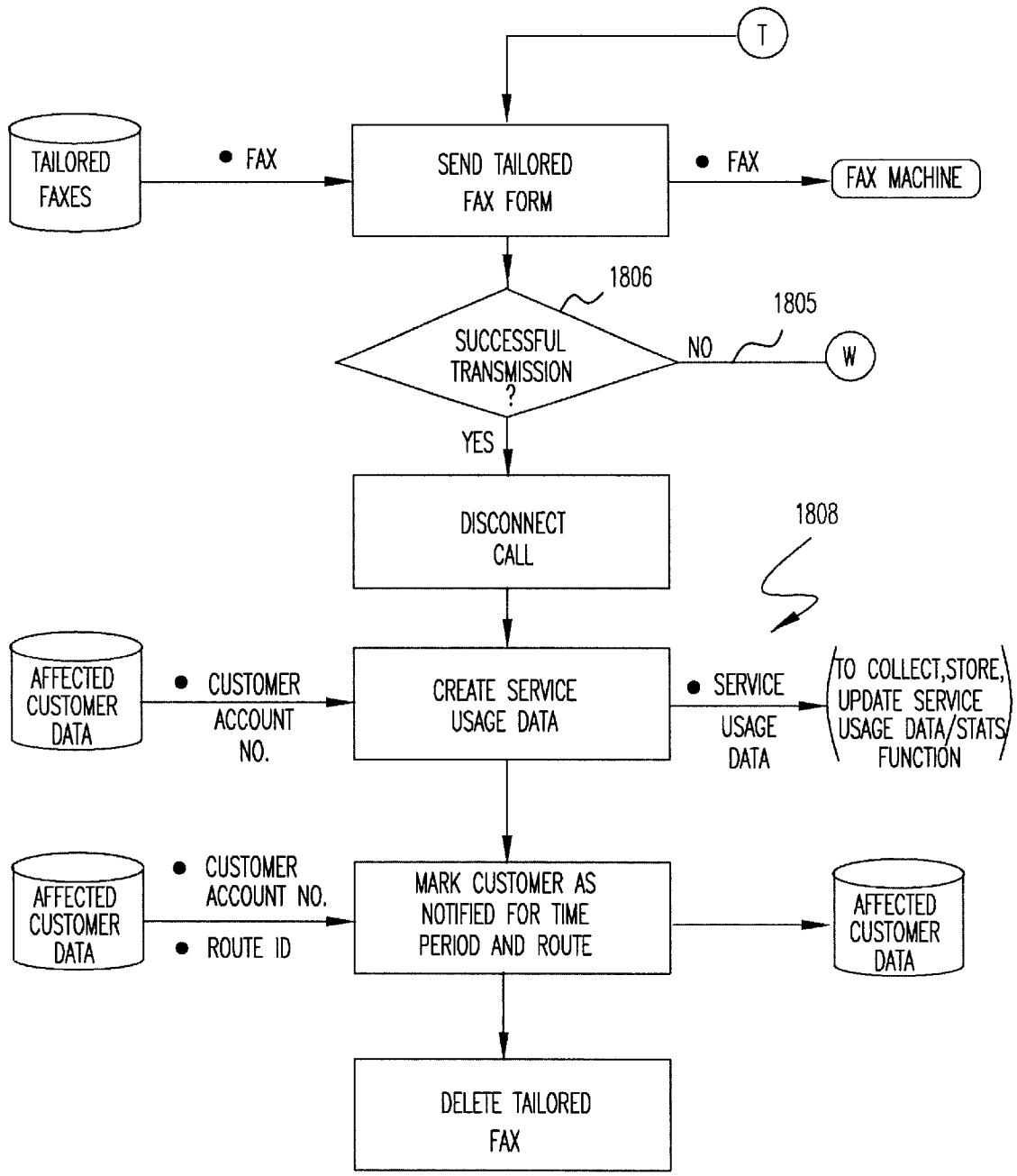
Figure 18C:
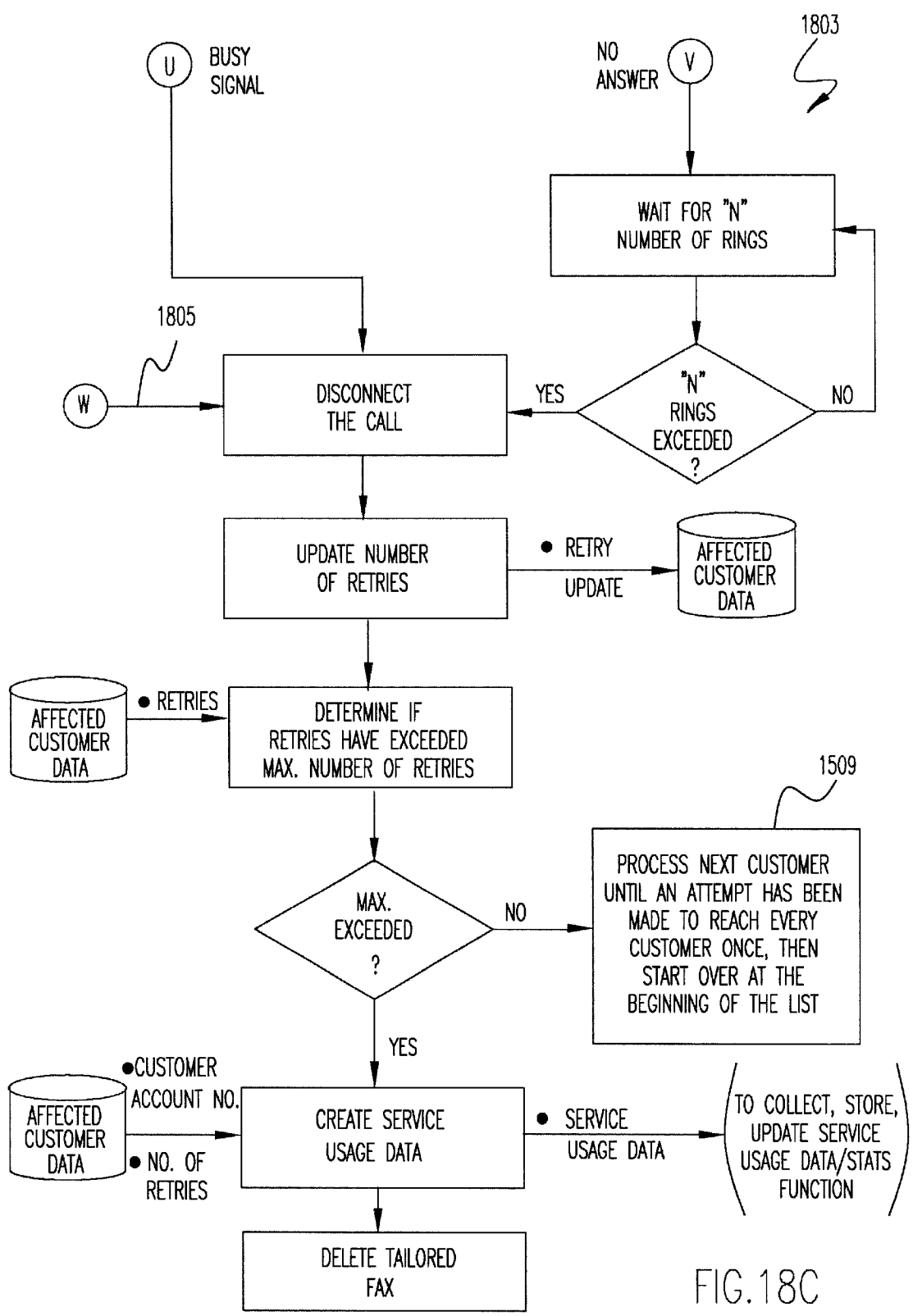

The sub-function, Disseminate Personalized Travel Conditions Information via Facsimile (Automatic Notification), illustrated in FIG. 18 manages the delivery of personalized travel conditions information messages via facsimile. It assembles the personalized travel conditions message according to a pre-defined format needed for a facsimile. It determines the correct phone number to use to contact each customer's fax machine. It manages the system according to the phone call response (e.g. answered, busy signal, or no answer) and delivers the facsimile when a successful connection is made. The sub-function will make a pre-defined number of attempts to deliver the message if a busy signal or no answer is received.

Delivery of notification by pager or facsimile thus differ somewhat from delivery of e-mail messages illustrated in FIG. 16 since, as with telephone notification, the facsimile address may return a no answer or busy signal. Accordingly, while a pager or facsimile message is built at 1701, 1801, respectively, and the pager or facsimile address retrieved from the customer's profile at 1702, 1802, respectively, in much the same manner as an e-mail message is built and addressed (but with suitable signal conversion for the intended device), branching is provided at 1703, 1803, respectively, to accommodate the possibility of a busy or no answer signal being returned.

Branches E' and F', collectively indicated at 1704, will be recognized as the process for limiting the number of retries illustrated in FIG. 15B and entered at E and F thereof, respectively, as discussed above, except that the process can also be entered at 1705, 1805 by detection of an unsuccessful transmission after successful connection at 1706, 1806. If the transmission is successful, the call is thereafter disconnected, service usage data is created, the customer is marked as notified and the message is deleted in whole or in part, as indicated at 1808. Deletion of only the address and personalized information such as the customer's registered name for an affected route may be preferable to rebuilding the entire message for each customer particularly for facsimile messages. In this regard, it may also be advantageous to alter notification order among auto-notification customers having a common or concurrent notification window by pager company to limit processing for rebuilding a portion of the pager message which will be common to a plurality of customers.

In summary, FIG. 11 illustrates the functional architecture of the MTIS similar to that of FIG. 2 but articulated to facilitate explanation in the context of an operational scenario. For example, a Traveler calls a customer service operator at the customer service center to become a registered user. The traveler then specifies, at a minimum, the following information: route(s) normally traveled, time of day the travel occurs, preferred means of notification (e.g. delivery devices) including, if desired a notification time window (which is otherwise, by default, the current time), and name, address, billing information (such as credit card number and expiration date). Using a profile entry workstation, the Customer Service Operator (or a network-connected customer) enters the data supplied by the traveler into their personal MTIS profile. A MTIS profile for that traveler is then created and the traveler becomes a registered user.

Concurrently, the staff or system or a combination of the two at the Traveler Information Center (TIC) continuously updates the Database containing the travel conditions information 201, or the travel conditions database is automatically updated with the travel conditions event. The primary source of this data is the Data Collection Infrastructure 20. This infrastructure gathers information through a variety of legacy (e.g. existing) transportation systems (e.g. loop detectors, video cameras, traffic operations managers, police, etc.). The data provided from each respective source will be in a predictable form from which automatic conversion for use by the system of the invention can be readily accomplished by techniques known by those skilled in the art. The traffic operations managers of the data collection infrastructure provide the information to the MTIS system in the geo-reference scheme defined in FIG. 3 and preferred event scheme defined in FIG. 4. If this information is not provided in the format defined in FIGS. 3 and 4, then the synthesis (e.g. fusing and packaging) of event data must be translated by either the MTIS or another system in accordance with FIGS. 3 and 4.

The staff/system at the TIC then use the contents of the Database 201 as they describe the Traffic Conditions and Effects for specific areas 301 (FIG. 3). Descriptions of these events and their affects are in text and/or audio recordings (e.g. phoneme data for a voice synthesizer). Text descriptions are disseminated via the Internet, FAX, e-mail, and Pager, collectively indicated at 205. Voice is recorded to be disseminated via the telephone. Both voice and text descriptions will be stored at 201 for repeated use.

Registered Users are informed of transportation conditions and their corresponding effects along their route. This occurs through the following steps:

1. The MTIS service will determine at 203 which of the routes traveled by Registered Users are affected by the current transportation conditions,
2. The MTIS service will also determine at 203 determine which Registered Users have a profile which indicates that they are using that route in the affected time frame, and
3. The MTIS service will communicate (60, 205) with the affected Registered Users via their chosen Delivery Device. If telephone were chosen, then the Registered User would be called and a voice recording would describe the situation. If FAX, e-mail, or Pager were chosen, then the Registered User would receive a text-based message.

Following this initial notification, Registered Users can request up-to-date information concerning a route by telephoning the MTIS service and specifying the route information. If any customer problems exist with their MTIS service, the Registered Users contact the customer service center's (204) Help Desk. A Customer Service Operator will record and track the problem. On a periodic basis, service usage statistics are collected to determine the frequency of the services utilized for off line analysis 206.

In the User On-Demand Request or call-in mode of operation for the Multi-Modal Traveler Information System (MTIS), the determination of whether a customer is affected by certain travel conditions can be performed in different ways. The main approach for determining affected customers, described above, has the determination being performed when the condition is reported. Customers that are affected by the condition are then stored in a database. When the customer contacts the MTIS, the database is checked to see if the customer is affected, and if so, the travel conditions information is reported to the customer.

This method requires information about customers affected by a travel condition to be stored in a database until that travel condition has ended. For certain travel conditions, such as severe weather (that would affect many customers at once) or road construction (that would affect a set of customers for a long period of time) the database could become quite large and more difficult to manage. As an alternative, the determination of customers affected by certain travel conditions, such as severe weather or road construction, could be performed at the time the customer contacts the MTIS. This way, there would be no requirement to store data about affected customers. However, MTIS response time may be adversely affected.

In view of the foregoing, it is seen that the system and method in accordance with the invention provides matching of available travel condition information with a user's needs and preferences in regard to notification time window and communication medium. The system and method supports on-demand, call-in provision of information as well as automatic notifications of events and allows the user to evaluate alternative routes and travel options at each node of a route. The system and method limits communicated information in regard to user identity, destination, route, node of conveyance and/or intended travel time and allows communication to include user-specified nomenclature for a route or portion thereof.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A method for selecting information from a database containing data and messages corresponding to said data and communicating said selected information of interest to a particular user in a selected manner, said method including the steps of registering personal information of interest and personal delivery information data in accordance with identification data for each user, constructing a filter from said personal information of interest to said user, filtering generalized information input to said database in accordance with said filter to construct a list of user identifications corresponding to said generalized information, and retrieving and communicating to a user identified in said list of user identifications a message corresponding to personal information of interest to said user corresponding to said generalized information input to said database in accordance with said personal delivery information corresponding to said user identified in said list of user identifications.

2. A method as recited in claim 1, further including the steps of registering a communication medium for a user, and constructing a message in accordance with said communication medium registered in said step of registering a communication medium.

3. A method as recited in claim 2, wherein said communication medium is one of a wired or wireless telephone link, a pager, a facsimile device and e-mail.

4. A method as recited in claim 1, further including the step of repeating said retrieving and communicating step for each user identified in said list of user identifications.

5. A method as recited in claim 1, comprising the further step of repeating said filtering step responsive to each entry of generalized information to said database.

6. A method as recited in claim 1, comprising the further step of performing said filtering step responsive to an inquiry by a user.

7. A method as recited in claim 1, further including the steps of registering a time window for a user;

filtering said list of user identifications against said time window; and performing said retrieving and communicating step for a user in accordance with said time window and a current time.

8. A method as recited in claim 1, wherein said messages include an identification, specified by said user, of personal information used in said step of constructing said filter.

9. A method as recited in claim 1, wherein said information of interest is in the form of attributes.

10. A method as recited in claim 9, wherein said information of interest includes a geo-referenced area.

11. A method as recited in claim 10, wherein said attributes include a geo-referenced location and travel mode.

12. A method as recited in claim 9, wherein said information of interest includes a geo-referenced location and travel mode.

13. A method as recited in claim 1, wherein said generalized information is travel condition information and said information of interest is multi-modal travel information corresponding to at least one geo-referenced area and at least one of a plurality of travel modes.

14. A method as recited in claim 1, wherein said delivery information includes a desired delivery time.

15. A method as recited in claim 1, wherein said delivery information specifies delivery upon user call-in.

* * * * *